US 11,390,389 B2

(12) United States Patent
Dunst

(10) Patent No.: US 11,390,389 B2
(45) Date of Patent: Jul. 19, 2022

(54) ROBUST SEQUENCER SYSTEMS FOR EJECTION ASSEMBLY

(71) Applicant: AMI Industries, Inc., Colorado Springs, CO (US)

(72) Inventor: Larry Dunst, Phoenix, AZ (US)

(73) Assignee: AMI Industries, Inc., Colorado Springs, CO (US)

(*) Notice: Subject to any disclaimer, the term of this patent is extended or adjusted under 35 U.S.C. 154(b) by 218 days.

(21) Appl. No.: 16/686,118

(22) Filed: Nov. 16, 2019

(65) Prior Publication Data

US 2021/0147089 A1    May 20, 2021

(51) Int. Cl.
*B64D 25/10* (2006.01)
*G05B 19/042* (2006.01)

(52) U.S. Cl.
CPC ......... *B64D 25/10* (2013.01); *G05B 19/0426* (2013.01); *G05B 19/0428* (2013.01); *G05B 2219/24182* (2013.01); *G05B 2219/25384* (2013.01)

(58) Field of Classification Search
CPC ........ B64D 25/10; B64D 17/62; B64D 17/74; B64D 11/0616; G05B 19/0426; G05B 19/0428; G05B 2219/24182; G05B 2219/25384
See application file for complete search history.

(56) References Cited

U.S. PATENT DOCUMENTS

| 3,554,472 | A | * | 1/1971 | McIntyre et al. | B64D 25/10 244/122 R |
| 5,222,695 | A | * | 6/1993 | Lake | B64D 25/10 244/122 AE |
| 5,349,654 | A | * | 9/1994 | Bond | G06F 11/08 714/4.5 |
| 2005/0230545 | A1 | * | 10/2005 | Ayoub | B64D 25/10 244/122 A |
| 2011/0313580 | A1 | * | 12/2011 | Bakhmach | G05B 9/03 700/292 |

(Continued)

FOREIGN PATENT DOCUMENTS

| CN | 101987627 A | * | 3/2011 |
| CN | 106005439 | | 1/2019 |
| CN | 209290728 | | 8/2019 |

(Continued)

OTHER PUBLICATIONS

European Patent Office, European Search Report dated Apr. 20, 2021 in Application No. 20207893.7.

*Primary Examiner* — Thomas C Lee
*Assistant Examiner* — Michael Tang
(74) *Attorney, Agent, or Firm* — Snell & Wilmer L.L.P.

(57) ABSTRACT

A sequencer system for an ejection assembly may comprise a first A-side controller and a second A-side controller in operable communication with the first A-side controller. A first B-side controller may be in operable communication with the first A-side controller. A second B-side controller may be in operable communication with the first B-side controller and the second A-side controller. The controllers may be configured to each make an initial ejection sequence determination and a verified ejection sequence determination. The controllers may make the verified ejection seat determination based on a two of three voting scheme.

19 Claims, 13 Drawing Sheets

(56) References Cited

U.S. PATENT DOCUMENTS

2016/0314057 A1* 10/2016 De Oliveira ........ G06F 11/1484

FOREIGN PATENT DOCUMENTS

| CN | 209290728 U | * | 8/2019 |
|----|-------------|---|--------|
| EP | 0354276 | | 2/1990 |
| EP | 0480733 | | 4/1992 |
| GB | 2120986 | | 12/1983 |

* cited by examiner

ROBUST SEQUENCER SYSTEMS FOR EJECTION ASSEMBLY

FIELD

The present disclosure relates to ejection assemblies, and more specifically, to robust sequencer systems for ejection assemblies and methods of forming the same.

BACKGROUND

Ejection assemblies are designed to expel ejection seats and their occupants from an aircraft. Typical ejection assemblies generally include one or more sequencer systems configured to determine and control the timing sequences for the deployment of various ejection assembly subsystems. For example, an ejection sequencer system may be configured to determine and control the timing sequences for deploying, or "firing", ejection assembly subsystems configured to expel one or more ejection seats from the aircraft (e.g., firing canopy drivers, firing seat catapult drivers, etc.). An ejection seat sequencer system may determine and control the timing sequence for deploying ejection assembly subsystems located on the ejection seat (e.g., drogue parachute mortars, main parachute mortars, harness release thrusters, etc.). The timing sequences for the various subsystems can vary depending on which ejection seat (e.g., fore or aft) is being ejected, the order in which the ejection seats are ejected, the type of ejection seat and/or aircraft, ejection conditions (e.g., altitude, velocity, seat orientation, etc.). Increased accuracy and reliability of the selected and implemented timing sequence (i.e., the timing for deploying each of ejection assembly subsystems) tends to reduce the risk of pilot injury.

SUMMARY

A sequencer system for an ejection assembly is disclosed herein. In accordance with various embodiments, the sequencer system may comprise a first A-side controller configured to determine a first initial ejection sequence and a first verified ejection sequence. A second A-side controller may be configured to determine a second initial ejection sequence and a second verified ejection sequence. A first B-side controller may be configured to determine a third initial ejection sequence and a third verified ejection sequence. A second B-side controller may be configured to determine a fourth initial ejection sequence and a fourth verified ejection sequence. The first A-side controller may be configured to determine the first verified ejection sequence based on a comparison of the first initial ejection sequence to the second initial ejection sequence and the third initial ejection sequence. The second A-side controller may be configured to determine the second verified ejection sequence based on a comparison of the second initial ejection sequence to the first initial ejection sequence and the fourth initial ejection sequence. The first B-side controller may be configured to determine the third verified ejection sequence based on a comparison of the third initial ejection sequence to the first initial ejection sequence and the fourth initial ejection sequence. The second B-side controller may be configured to determine the fourth verified ejection sequence based on a comparison of the fourth initial ejection sequence to the third initial ejection sequence and the second initial ejection sequence.

In various embodiments, the first A-side controller may be configured to implement the first initial ejection sequence as the first verified ejection sequence, if the first A-side controller determines that the first initial ejection sequence matches at least one of the second initial ejection sequence or the third initial ejection sequence. The first A-side controller may be configured to implement at least one of the second initial ejection sequence or the third initial ejection sequence as the first verified ejection sequence, if the first A-side controller determines that the second initial ejection sequence matches the third initial ejection sequence and that the first initial ejection sequence does not match the second initial ejection sequence.

In various embodiments, a first fore-aft electronic explosive device driver module may be configured to receive a first driver sequence command from the first A-side controller and a second sequence command from the second A-side controller. A second fore-aft electronic explosive device driver module may be configured to receive a third driver sequence command from the first B-side controller and a fourth sequence command from the second B-side controller.

In various embodiments, the first fore-aft electronic explosive device driver module may include a first electronic explosive device driver configured to output a first firing signal if the first driver sequence command matches the second sequence command. In various embodiments, the second fore-aft electronic explosive device driver module may include a second electronic explosive device driver configured to output a second firing signal if the third driver sequence command matches the fourth sequence command.

In various embodiments, the first firing signal and the second firing signal may be output to an ejection subcomponent. In various embodiments, the ejection subcomponent may be at least one of a canopy driver or a catapult driver. In various embodiments, the ejection subcomponent may be at least one of a parachute mortar or a harness release thruster.

An ejection seat is also disclosed herein. In accordance with various embodiments, the ejection seat may comprise a parachute mortar, a harness release thruster, and an ejection seat sequencer system configured to control a timing for firing the parachute mortar and the harness release thruster. The ejection seat sequencer system may comprise a first A-side controller configured to determine a first initial ejection sequence and a first verified ejection sequence, a second A-side controller configured to determine a second initial ejection sequence and a second verified ejection sequence, a first B-side controller configured to determine a third initial ejection sequence and a third verified ejection sequence, and a second B-side controller configured to determine a fourth initial ejection sequence and a fourth verified ejection sequence. The first A-side controller may be configured to determine the first verified ejection sequence based on a comparison of the first initial ejection sequence to the second initial ejection sequence and the third initial ejection sequence. The second A-side controller may be configured to determine the second verified ejection sequence based on a comparison of the second initial ejection sequence to the first initial ejection sequence and the fourth initial ejection sequence. The first B-side controller may be configured to determine the third verified ejection sequence based on a comparison of the third initial ejection sequence to the first initial ejection sequence and the fourth initial ejection sequence. The second B-side controller may be configured to determine the fourth verified ejection sequence based on a comparison of the fourth initial ejection sequence to the third initial ejection sequence and the second initial ejection sequence.

In various embodiments, the first A-side controller may be configured to implement the first initial ejection sequence as the first verified ejection sequence, if the first A-side controller determines that the first initial ejection sequence matches at least one of the second initial ejection sequence or the third initial ejection sequence. The second A-side controller may be configured to implement the second initial ejection sequence as the second verified ejection sequence, if the second A-side controller determines that the second initial ejection sequence matches at least one of the first initial ejection sequence or the fourth initial ejection sequence. The first B-side controller may be configured to implement the third initial ejection sequence as the third verified ejection sequence, if the first B-side controller determines that the third initial ejection sequence matches at least one of the first initial ejection sequence or the fourth initial ejection sequence. The second B-side controller may be configured to implement the fourth initial ejection sequence as the fourth verified ejection sequence, if the second B-side controller determines that the fourth initial ejection sequence matches at least one of the third initial ejection sequence or the second initial ejection sequence.

In various embodiments, the first A-side controller may be configured to implement at least one of the second initial ejection sequence or the third initial ejection sequence as the first verified ejection sequence, if the first A-side controller determines that the second initial ejection sequence matches the third initial ejection sequence and that the first initial ejection sequence does not match the second initial ejection sequence. The second A-side controller may be configured to implement at least one of the first initial ejection sequence or the fourth initial ejection sequence as the second verified ejection sequence, if the second A-side controller determines that the first initial ejection sequence matches the fourth initial ejection sequence and that the second initial ejection sequence does not match the first initial ejection sequence. The first B-side controller may be configured to implement at least one of the first initial ejection sequence or the fourth initial ejection sequence as the third verified ejection sequence, if the first B-side controller determines that the first initial ejection sequence matches the fourth initial ejection sequence and that the third initial ejection sequence does not match the first initial ejection sequence. The second B-side controller may be configured to implement at least one of the second initial ejection sequence or the third initial ejection sequence as the fourth verified ejection sequence, if the second B-side controller determines that the second initial ejection sequence matches the third initial ejection sequence and that the fourth initial ejection sequence does not match the third initial ejection sequence.

In various embodiments, the ejection seat sequencer system may further comprise a first fore-aft electronic explosive device driver module configured to receive a first driver sequence command from the first A-side controller and a second sequence command from the second A-side controller. The ejection seat sequencer system may further comprise a second fore-aft electronic explosive device driver module configured to receive a third driver sequence command from the first B-side controller and a fourth sequence command from the second B-side controller.

In various embodiments, the first fore-aft electronic explosive device driver module may include a first electronic explosive device driver configured to output a first firing signal to the parachute mortar if the first driver sequence command matches the second sequence command. The second fore-aft electronic explosive device driver module may include a second electronic explosive device driver configured to output a second firing signal to the parachute mortar if the third driver sequence command matches the fourth sequence command.

A method for determining an ejection sequence is also disclosed herein. In accordance with various embodiments, the method may comprise the steps of determining, by a first A-side controller, a first initial ejection sequence; determining, by a second A-side controller, a second initial ejection sequence, determining, by a first B-side controller, a third initial ejection sequence; and determining, by a second B-side controller, a fourth initial ejection sequence. The method may further include determining, by the first A-side controller, a first verified ejection sequence based on a comparison of the first initial ejection sequence, the second initial ejection sequence, and the third initial ejection sequence.

In various embodiments, the step of determining, by the first A-side controller, the first verified ejection sequence may comprise the steps of determining, by the first A-side controller, if the first initial ejection sequence matches at least one of the second initial ejection sequence or the third initial ejection sequence; and implementing, by the first A-side controller, the first initial ejection sequence as the first verified ejection sequence if the first initial ejection sequence matches the at least one of the second initial ejection sequence or the third initial ejection sequence.

In various embodiments, the step of determining, by the first A-side controller, the first verified ejection sequence may further comprise the steps of determining, by the first A-side controller, if the second initial ejection sequence matches the third initial ejection sequence; and implementing, by the first A-side controller, the second initial ejection sequence as the first verified ejection sequence if the first initial ejection sequence does not match the at least one of the second initial ejection sequence or the third initial ejection sequence and if the second initial ejection sequence matches the third initial ejection sequence.

In various embodiments, the step of determining, by the first A-side controller, the first verified ejection sequence may further comprise the step of implementing, by the first A-side controller, a default ejection sequence as the first verified ejection sequence if the first initial ejection sequence does not match the at least one of the second initial ejection sequence or the third initial ejection sequence and if the second initial ejection sequence does not match the third initial ejection sequence.

In various embodiments, the method may further comprise the steps of determining, by the second A-side controller, a second verified ejection sequence based on a comparison of the second initial ejection sequence, the first initial ejection sequence, and the fourth initial ejection sequence; determining, by the first B-side controller, a third verified ejection sequence based on a comparison of the third initial ejection sequence, the first initial ejection sequence, and the fourth initial ejection sequence; and determining, by the second B-side controller, a fourth verified ejection sequence based on a comparison of the fourth initial ejection sequence, the second initial ejection sequence and the third initial ejection sequence.

In various embodiments, the step of determining, by the second A-side controller, the second verified ejection sequence may comprise the steps of determining, by the second A-side controller, if the second initial ejection sequence matches at least one of the first initial ejection sequence or the fourth initial ejection sequence; and implementing, by the second A-side controller, the second initial ejection sequence as the second verified ejection sequence if the second initial ejection sequence matches the at least one of the first initial ejection sequence or the fourth initial ejection sequence. The step of determining, by the second A-side controller, the second verified ejection sequence may further comprise the steps of determining, by the second A-side controller, if the first initial ejection sequence matches the fourth initial ejection sequence; implementing, by the second A-side controller, the first initial ejection sequence as the second verified ejection sequence if the second initial ejection sequence does not match the at least one of the first initial ejection sequence or the fourth initial ejection sequence and if the first initial ejection sequence matches the fourth initial ejection sequence; and implementing, by the second A-side controller, a default ejection sequence as the second verified ejection sequence if the second initial ejection sequence does not match the at least one of the first initial ejection sequence or the fourth initial ejection sequence and if the first initial ejection sequence does not match the fourth initial ejection sequence.

In various embodiments, the step of determining, by the first B-side controller, the third verified ejection sequence may comprise the steps of determining, by the first B-side controller, if the third initial ejection sequence matches at least one of the first initial ejection sequence or the fourth initial ejection sequence; and implementing, by the first B-side controller, the third initial ejection sequence as the third verified ejection sequence if the third initial ejection sequence matches the at least one of the first initial ejection sequence or the fourth initial ejection sequence. The step of determining, by the first B-side controller, the third verified ejection sequence may further comprise the steps of determining, by the first B-side controller, if the first initial ejection sequence matches the fourth initial ejection sequence; implementing, by the first B-side controller, the first initial ejection sequence as the third verified ejection sequence if the third initial ejection sequence does not match the at least one of the first initial ejection sequence or the fourth initial ejection sequence and if the first initial ejection sequence matches the fourth initial ejection sequence; and implementing, by the first B-side controller, the default ejection sequence as the third verified ejection sequence if the third initial ejection sequence does not match the at least one of the first initial ejection sequence or the fourth initial ejection sequence and if the first initial ejection sequence does not match the fourth initial ejection sequence.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
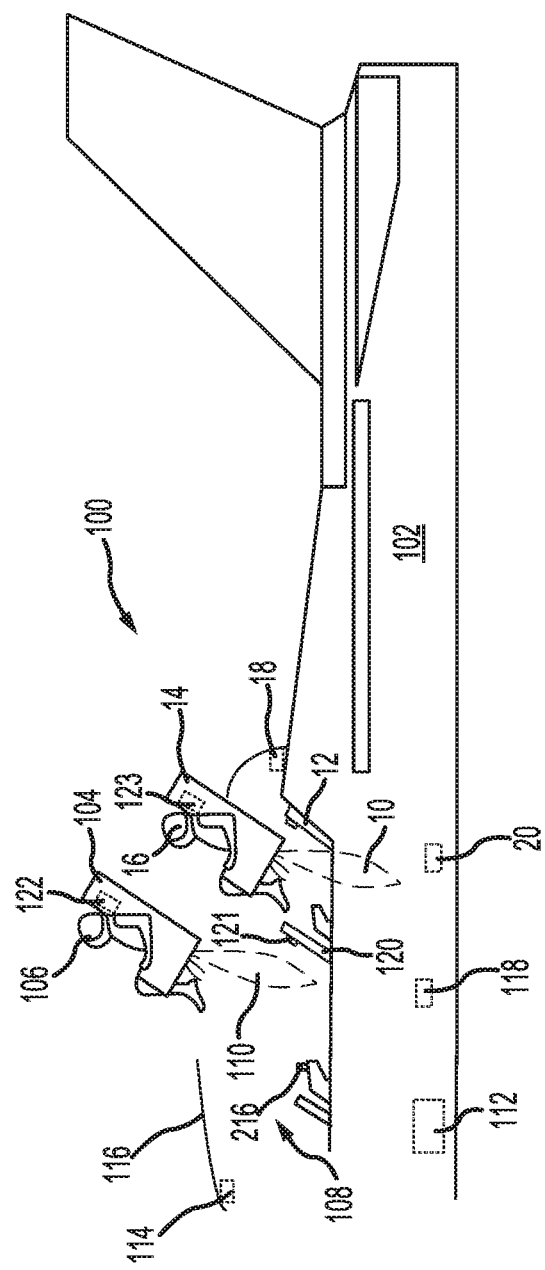
FIG. 1 illustrates an ejection assembly launching ejection seats from an aircraft cockpit, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Sequencer systems for ejection assemblies are disclosed herein. In accordance with various embodiments, the sequencer systems for ejection assemblies may be programmed with multiple timing sequences. Which timing sequence to employ may be determined based on various conditions, for example, pilot ejection mode selection, the type or model of ejection seats and aircrafts, the flight conditions at ejection, etc. In accordance with various embodiments, the hardware of the disclosed sequencer systems provides for a majority (e.g., two of three) voting scheme, wherein an initial (or requested) sequence determination is made individually by each of four sequencer system controllers. The initial sequence determination of each controller is compared to the initial ejection sequence determination of two of the other four system controllers. Each controller may be configured to determine a verified (or actual) sequence determination based on the comparison. A sequencer system, as disclosed herein, provides redundancy allowing operation in the presence of a single system failure and increasing the likelihood that system operates correctly or as desired. In this regard, the sequencer systems, disclosed herein, are configured to fire only when desired and to prevent, or reduce a probability, of an unintentional firing.

With reference to FIG. 1, an aircraft ejection assembly 100 is shown. In accordance with various embodiments, aircraft ejection assembly 100 may be installed in aircraft 102 to safely expel a first (or forward) ejection seat 104 and an occupant 106 of first ejection seat 104 from a cockpit 108 of aircraft 102. First ejection seat 104 may be urged from cockpit 108 by a first (or forward) propulsion system 110, also referred to as a forward seat catapult system. In various embodiments, aircraft ejection assembly 100 may also expel a second (or aft) ejection seat 14 and an occupant 16 of second ejection seat 14 from cockpit 108. Second ejection seat 14 may be urged from cockpit 108 by a second (or aft) propulsion system 10, also referred to as an aft seat catapult system.

Aircraft ejection assembly 100 may include a sequencer system 112. Sequencer system 112 may be an ejection sequencer system configured to determine and control the timing (i.e., sequence) of subsystems associated with expelling first ejection seat 104 and/or second ejection seat 14 from cockpit 108. For example, sequencer system 112 may control the firing of one or more forward canopy driver(s) 114 configured to remove canopy 116 from over first ejection seat 104, and one or more aft canopy driver(s) 18 configured to remove canopy 116 from over second ejection seat 14. Sequencer system 112 may control the firing of one or more forward catapult driver(s) 118 configured to ignite propulsion system 110 and thereby drive first ejection seat 104 along rails 120 and out cockpit 108. Sequencer system 112 may control the firing of one or more aft catapult driver(s) 20 configured to ignite propulsion system 10 and thereby drive second ejection seat 14 along rails 12 and out cockpit 108. In accordance with various embodiments, sequencer system 112 may be located in and/or mounted to aircraft 102. While sequencer system 112 is described as controlling the ejection sequence for an ejection assembly including a forward ejection seat and an aft ejection seat aft, it is further contemplated that understood that sequencer system 112 may be employed in ejection assemblies including any number (one, three, four, etc.) of ejection seats, with the ejection seat(s) at any location (left, right, forward-left, aft-left, forward right, etc.) in cockpit 108.

Figure 3:
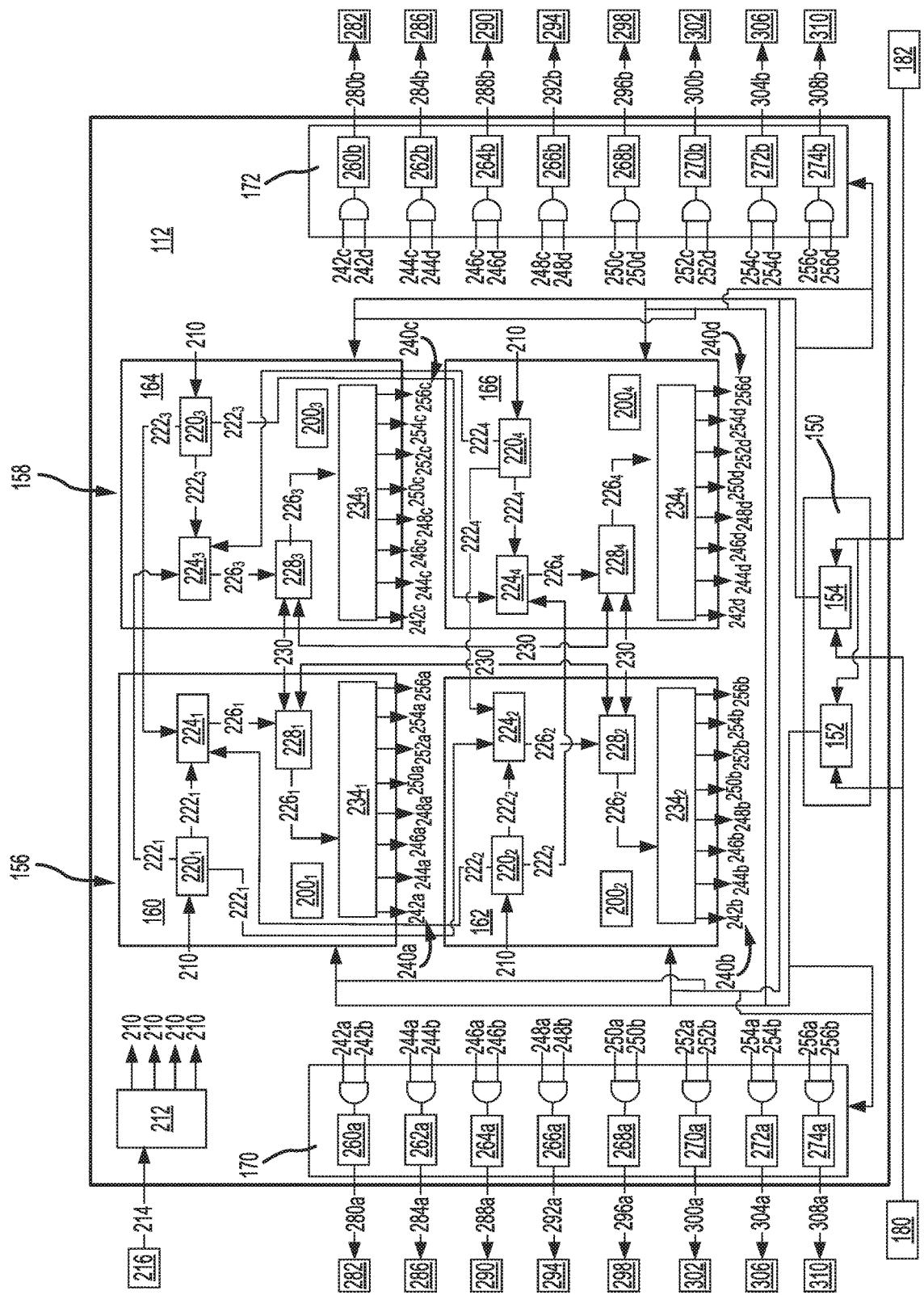
FIG. 3 illustrates a sequencer system of an ejection assembly, in accordance with various embodiments.

With reference to FIG. 3, a schematic of sequencer system 112 is illustrated. In accordance with various embodiments, sequencer system 112 may include a power circuit 150. Power circuit 150 may include a first logic power module 152 and a second logic power module 154. First and second logic power modules 152, 154 may each be configured to provide power to a first set of controllers 156 of sequencer system 112 (also referred to herein as "A-side controllers 156") and a second set of controllers 158 of sequencer system 112 (also referred to herein as "B-side controllers 158"). The A-side controllers 156 may include a first A-side controller 160 (also referred to as A-side upper controller 160) and a second A-side controller 162 (also referred to as A-side lower controller 162). The B-side controllers 158 may include a first B-side controller 164 (also referred to as B-side upper controller 164) and a second B-side controller 166 (also referred to as B-side lower controller 166).

First and second logic power modules 152, 154 may each be configured to also provide power to an A-side (or first) fore-aft electronic explosive device (EED) driver module 170 of sequencer system 112 and a B-side (or second) fore-aft EED driver module 172 of sequencer system 112. A-side fore-aft EED driver module 170 is configured to receive sequence commands from A-side controllers 156. B-side fore-aft EED driver module 172 is configured to receive sequence commands from B-side controllers 158. Sequencer system 112 including two logic power modules (i.e., first logic power module 152 and second logic power module 154) provides a redundancy. In this regard, should one of first logic power module 152 or second logic power module 154 fail, the other of first logic power module 152 and second logic power module 154 provides power to A-side controllers 156, B-side controllers 158, A-side fore-aft EED driver module 170, and B-side fore-aft EED driver module 172.

In various embodiments, a first external power source 180 (also referred to as a first forward power source) and a second external power source 182 (also referred to as a first aft power source) may be configured to provide power to power circuit 150. Each of first external power source 180 and second external power source 182 may be electrically coupled to both first logic power module 152 and second logic power module 154. In this regard, should one of first external power source 180 or second external power source 182 fail, the other of first external power source 180 and second external power source 182 provides power to both first logic power module 152 and second logic power module 154. In various embodiments, a third (or second forward) power source and a fourth (or second aft) power source may also be electrically coupled and configured to provide power to each of first logic power module 152 and second logic power module 154.

In various embodiments, first external power source 180 and second external power source 182 may be configured to activate in response to initiation of an ejection sequence. For example, first external power source 180 and second external power source 182 may be activated in response to actuation of handle 140, with momentary reference to FIG. 2. Upon activation, first external power source 180 and second external power source 182 provide electricity (e.g., current) to power circuit 150. In various embodiments, first external power source 180 and second external power source 182 may each comprise a thermal battery configured to activate in response to initiation of the ejection sequence (e.g., in response to actuation of handle 140, or other ejection initiating event). For example, initiation of the ejection sequence may cause a chemical reaction within the thermal battery. The chemical reaction generates electricity that is provided to first and second logic power modules 152, 154.

A-side upper controller 160, A-side lower controller 162, B-side upper controller 164, and B-side lower controller 166 (collectively controllers 160, 162, 164, 166) may each include one or more processors and one or more tangible, non-transitory memories $200_1$, $200_2$, $200_3$, $200_4$, respectively, and may be capable of implementing logic. The processor(s) can be general purpose processor(s), digital signal processor(s) (DSPs), application specific integrated circuits (ASICs), field programmable gate arrays (FPGAs) or other programmable logic devices, discrete gates or transistor logics, discrete hardware components, or a combination thereof. As discussed in further detail below, controllers 160, 162, 164, 166 may be configured to each make an initial ejection sequence determination based on ejection data received by the controller and a verified ejection seat determination based on a comparison the between the controller's initial ejection sequence determination and the initial ejection sequence determination of two of the other controllers. In accordance with various embodiments, the two other controllers may include one controller from the same side (e.g., A-side 156 or B-side 158) and one controller from the cross-side (i.e., the other of A-side 156 or B-side 158). In this regard, controllers 160, 162, 164, 166 may verify that the timing sequence output from each controller is consistent with (i.e., matches) the timing sequence output by each of the other controllers. As used herein, a first controller that is on the "same side" as a second controller means that the first controller and the second controller output driver sequence command signals to one and/or the same EED driver module. As used herein, a first controllers that is on the "cross-side" from a second controller means that the first controller outputs driver sequence commands to a first EED driver module and the second controller outputs driver sequence commands to a second EED driver module different from the first EED driver module.

In various embodiments, in response to activation of first and second logic power modules 152, 154 (i.e., in response to first and second logic power modules 152, 154 receiving power from first external power source 180 and/or second external power source 182) controllers 160, 162, 164, 166 may receive a mode select signal 210. In various embodiments, controllers 160, 162, 164, 166 may receive mode select signal 210 via a mode selector interface 212 of sequencer system 112. Mode selector interface 212 may output mode select signal 210 in response to a sequence select signal 214 output from a pilot switch 216. In various embodiments, pilot switch 216 may be located in the cockpit. Stated differently, sequence select signal 214 may be sent from the cockpit. In various embodiments, occupant 106, with momentary reference to FIG. 1, selects a particular ejection sequence using pilot switch 216 (e.g., by actuating pilot switch 216). For example, with momentary reference to FIG. 1, pilot switch 216 may allow occupant 106 to select that first ejection seat 104 is ejected prior to, after, or simultaneously with second ejection seat 14. The sequence select signal 214 output from pilot switch 216 corresponds to the ejection sequence selected by occupant 106. Mode selector interface 212 is configured to receive and decipher sequence select signal 214 and output a mode select signal 210 corresponding to sequence select signal 214 (i.e., corresponding to the ejection sequence selected by occupant 106). Mode selector interface 212 is configured to output the mode select signal 210 to each of controllers 160, 162, 164, 166.

In accordance with various embodiments, the mode select signal 210 may be sent to an initial sequence determination module $220_1$, $220_2$, $220_3$, $220_4$, respectively, of each controller 160, 162, 164, 166. Initial sequence determination modules $220_1$, $220_2$, $220_3$, $220_4$ may each make an initial sequence determination $222_1$, $222_2$, $222_3$, $222_4$, respectively, based on the mode select signal 210. Initial sequence determination $222_1$, $222_2$, $222_3$, $222_4$ is a timing schedule (or time delay) for firing the ejection assembly subsystems (e.g., for firing forward canopy drivers 114, forward catapult driver 118, aft canopy drivers 18, and/or aft catapult driver 20 in FIG. 1).

In accordance with various embodiments, the initial sequence determinations $222_1$, $222_2$, $222_3$, $222_4$ from initial sequence determination modules $220_1$, $220_2$, $220_3$, $220_4$ may be sent to a comparison module $224_1$, $224_2$, $224_3$, $224_4$ in that controller and to the comparison module $224_1$, $224_2$, $224_3$, $224_4$ of the same side controller and to the comparison module $224_1$, $224_2$, $224_3$, $224_4$ of one of the cross-side controllers. For example, in various embodiments, the initial sequence determination $222_1$ generated by A-side upper controller 160 is sent to comparison module $224_2$ of A-side lower controller 162 and to comparison module $224_3$ of B-side upper controller 164. The initial sequence determination $222_3$ generated by B-side upper controller 164 is sent to comparison module $224_4$ of B-side lower controller 166 and comparison module $224_1$ of A-side upper controller 160. The initial sequence determination $222_2$ generated by A-side lower controller 162 is sent to comparison module $224_4$ of B-side lower controller 166 and comparison module $224_1$ of A-side upper controller 160. The initial sequence determination $222_4$ generated by B-side lower controller 166 is sent to comparison module $224_3$ of B-side upper controller 164 and comparison module $224_4$ of A-side lower controller 162.

Each controller 160, 162, 164, 166 compares its initial sequence determination $222_1$, $222_2$, $222_3$, $222_4$ to two of the other initial sequence determinations (e.g., one initial sequence determinations from a same side controller and one initial sequence determination from a cross-side controller). Each comparison module $224_1$, $224_2$, $224_3$, $224_4$ determines a verified (or actual) sequence determination $226_1$, $226_2$, $226_3$, $226_4$, respectively, based on the comparison, wherein for a majority (e.g., two of three) voting scheme. In accordance with various embodiments, the controller comparison modules $224_1$, $224_2$, $224_3$, $224_4$ may employ a two of three voting scheme to determine the verified sequence determinations $226_1$, $226_2$, $226_3$, $226_4$.

In various embodiments, comparison module $224_1$ of A-side upper controller 160 may make its verified sequence determination $226_1$ using a two of three voting scheme based on its initial sequence determinations $222_1$ and the initial sequence determinations $222_2$ from A-side lower controller 162 and the initial sequence determinations $222_3$ from B-side upper controller 164. For example, if the comparison module $224_1$ of A-side upper controller 160 determines that the initial sequence determination $222_1$ of A-side upper controller 160 matches (i.e., is the same timing sequence as) either of the initial sequence determination $222_2$ generated by A-side lower controller 162 or the initial sequence determination $222_3$ generated by B-side upper controller 164, then comparison module $224_1$ of A-side upper controller 160 outputs initial sequence determination $222_1$ as the verified sequence determination $226_1$. If the comparison module $224_1$ of A-side upper controller 160 determines that the initial sequence determination $222_3$ of B-side upper controller 164 matches the initial sequence determinations $222_2$ of A-side lower controller 162, but that the initial sequence determination $222_1$ of A-side upper controller 160 does not match (i.e., is a different timing sequence than) the initial sequence determination $222_2$ generated by A-side lower controller 162 and the initial sequence determination $222_3$ generated by B-side upper controller 164, then comparison module $224_1$ outputs the initial sequence determinations $222_2$, $222_3$ of A-side lower controller 162 and B-side upper controller 164 as verified sequence determination $226_1$.

If comparison module $224_1$ of A-side upper controller 160 determines the initial sequence determination $222_1$ of A-side upper controller 160 is different from initial sequence determination $222_2$ of A-side lower controller 162 and from initial sequence determination $222_3$ of B-side upper controller 164 and that initial sequence determination $222_2$ is different from initial sequence determinations $222_3$ (i.e., if none of the three initial sequence determinations $222_1$, $222_2$, $222_3$ match), then comparison module $224_1$ of A-side upper controller 160 outputs a default ejection sequence as verified sequence determination $226_1$.

Comparison module $224_2$ of A-side lower controller 162 may make its verified sequence determination $226_2$ using a two of three voting scheme based on initial sequence determination $222_2$ and the initial sequence determination $222_1$ from A-side upper controller 160 and the initial sequence determination $222_4$ from B-side lower controller 166. For example, if comparison module $224_2$ determines the initial sequence determination $222_2$ of A-side lower controller 162 matches (i.e., is the same timing sequence as) either of the initial sequence determination $222_4$ generated by B-side lower controller 166 or the initial sequence determination $222_1$ generated by A-side upper controller 160, then comparison module $224_2$ of A-side lower controller 162 outputs initial sequence determination $222_2$ as verified sequence determination $226_2$. If comparison module $224_2$ of A-side lower controller 162 determines that the initial sequence determination $222_4$ generated by B-side lower controller 166 matches the initial sequence determination $222_1$ generated by A-side upper controller 160 and that the initial sequence determination $222_2$ of A-side lower controller 162 does not match the initial sequence determinations $222_1$, $222_4$ of A-side upper controller 160 and B-side lower controller 166, then comparison module $224_2$ of A-side lower controller 162 outputs the initial sequence determinations $222_1$, $222_4$ of A-side upper controller 160 and B-side lower controller 166 as the verified sequence determination $226_2$.

If comparison module $224_2$ of A-side lower controller 162 determines the initial sequence determination $222_2$ of A-side lower controller 162 is different from initial sequence determination $222_1$ of A-side upper controller 160 and from the initial sequence determination $222_4$ of B-side lower controller 166 and that A-side upper initial sequence determination $222_1$ is different from B-side lower initial sequence determinations $222_4$ (i.e., if none of the three initial sequence determinations $222_1$, $222_2$, $222_4$ match), then comparison module $224_2$ of A-side lower controller 162 outputs a default ejection sequence as verified sequence determination $226_2$.

Comparison module $224_3$ of B-side upper controller 164 may make its verified sequence determination $226_3$ using a two of three voting scheme based on its initial sequence determinations $222_3$ and the initial sequence determinations $222_1$ from A-side upper controller 160 and the initial sequence determinations $222_4$ from B-side lower controller 166. For example, if the initial sequence determination $222_3$ of B-side upper controller 164 matches (i.e., is the same timing sequence as) either of the initial sequence determination $222_4$ generated by B-side lower controller 166 or the initial sequence determination $222_1$ generated by A-side upper controller 160, then comparison module $224_3$ of B-side upper controller 164 outputs the initial sequence determination $222_3$ of B-side upper controller 164 as verified sequence determination $226_3$. If comparison module $224_3$ of B-side upper controller 164 determines that the initial sequence determination $222_4$ generated by B-side lower controller 166 matches the initial sequence determination $222_1$ generated by A-side upper controller 160 and that the initial sequence determination $222_3$ of B-side upper controller 164 does not match the initial sequence determinations $222_1$, $222_4$ of A-side upper controller 160 and B-side lower controller 166, then comparison module $224_3$ of B-side upper controller 164 outputs the initial sequence determinations $222_1$, $222_4$ of A-side upper controller 160 and B-side lower controller 166 as the verified sequence determination $226_3$.

If comparison module $224_3$ of B-side upper controller 164 determines the initial sequence determination $222_3$ of B-side upper controller 164 is different from initial sequence determination $222_1$ of A-side upper controller 160 and from initial sequence determinations $222_4$ of B-side lower controller 166 and that A-side upper initial sequence determination $222_1$ is different from B-side lower initial sequence determination $222_4$ (i.e., if none of the three initial sequence determinations $222_1$, $222_3$, $222_4$ match), then comparison module $224_3$ of B-side upper controller 164 outputs a default ejection sequence as verified sequence determination $226_3$.

Comparison module $224_4$ of B-side lower controller 166 may make its verified sequence determination $226_4$ using a two of three voting scheme based on its initial sequence determinations $222_4$ and the initial sequence determinations $222_2$ from A-side lower controller 162 and the initial sequence determinations $222_3$ from B-side upper controller 164. For example, if the comparison module $224_4$ of B-side lower controller 166 determines that the initial sequence determination $222_4$ matches (i.e., is the same timing sequence as) either of the initial sequence determination $222_2$ generated by A-side lower controller 162 or the initial sequence determination $222_3$ generated by B-side upper controller 164, then comparison module $224_4$ of B-side lower controller 166 outputs initial sequence determination $222_4$ as the verified sequence determination $226_4$. If the comparison module $224_4$ determines that the initial sequence determination $222_3$ of B-side upper controller 164 matches the initial sequence determinations $222_2$ of A-side lower controller 162, but that the initial sequence determination $222_4$ of B-side lower controller 166 does not match (i.e., is a different timing sequence than) the initial sequence determinations $222_2$, $222_3$ generated by A-side lower controller 162 and B-side upper controller 164, then comparison module $224_4$ outputs the initial sequence determinations $222_2$, $222_3$ of A-side lower controller 162 and B-side upper controller 164 as verified sequence determination $226_4$.

If comparison module $224_4$ of B-side lower controller 166 determines the initial sequence determination $222_4$ of B-side lower controller 166 is different from initial sequence determination $222_2$ of A-side lower controller 162 and from initial sequence determinations $222_3$ of B-side upper controller 164 and that initial sequence determination $222_2$ is different from initial sequence determinations $222_3$ (i.e., if none of the three initial sequence determinations $222_2$, $222_3$, $222_4$ match), then comparison module $224_4$ of B-side lower controller 166 outputs a default ejection sequence as verified sequence determination $226_4$.

Controllers 160, 162, 164, 166 may each include a synchronization module $228_1$, $228_2$, $228_3$, $228_4$, respectively.

Verified sequence determination $226_1$, $226_2$, $226_3$, $226_4$ may be sent, respectively, to synchronization modules $228_1$, $228_2$, $228_3$, $228_4$. Timing outputs 230 may be sent between synchronization modules $228_1$, $228_2$, $228_3$, $228_4$ to coordinate an outputting of verified sequence determination $226_1$, $226_2$, $226_3$, $226_4$. Stated differently, synchronization modules $228_1$, $228_2$, $228_3$, $228_4$ may communicate with one another and may be configured to begin the ejection sequence corresponding to the verified sequence determinations $226_1$, $226_2$, $226_3$, $226_4$, at the same time. In various embodiments, the synchronization modules $228_1$, $228_2$, $228_3$, $228_4$ may communicate with the same two controllers employed in verified sequence determination. For example, in various embodiments, synchronization modules $228_1$ of A-side upper controller 160 may communicate with the synchronization module $228_2$ of A-side lower controller 162 and synchronization module $228_3$ of B-side upper controller 164, synchronization module $228_3$ of B-side upper controller 164 may communicate with the synchronization module $228_4$ of B-side lower controller 166 and synchronization module $228_1$ of A-side upper controller 160, etc.

Controllers 160, 162, 164, 166 may each include a driver signal generation module $234_1$, $234_2$, $234_3$, $234_4$, respectively. Driver signal generation modules $234_1$, $234_2$, $234_3$, $234_4$ may be configured to receive verified sequence determinations $226_1$, $226_2$, $226_3$, $226_4$ and output a series of driver sequence commands corresponding to the verified sequence determination. For example, driver signal generation module $234_1$ of A-side upper controller 160 receives verified sequence determination $226_1$ and outputs driver sequence commands 240a. Driver sequence commands 240a include, for example, driver sequence commands 242a, 244a, 246a, 248a, 250a, 252a, 254a, 256a. The timing of when each of driver sequence commands 242a, 244a, 246a, 248a, 250a, 252a, 254a, 256a is output corresponds to verified sequence determination $226_1$. Stated differently, driver signal generation module $234_1$ may determine when to output each of driver sequence commands 242a, 244a, 246a, 248a, 250a, 252a, 254a, 256a based on verified sequence determination $226_1$.

Driver signal generation module $234_2$ of A-side lower controller 162 receives verified sequence determination $226_2$ and outputs a series of driver sequence commands 240b. Driver sequence commands 240b may include, for example, driver sequence commands 242b, 244b, 246b, 248b, 250b, 252b, 254b, 256b. The timing of when each of driver sequence commands 242b, 244b, 246b, 248b, 250b, 252b, 254b, 256b is output corresponds to verified sequence determination $226_2$. Stated differently, driver signal generation module $234_2$ may determine when to output each of driver sequence commands 242b, 244b, 246b, 248b, 250b, 252b, 254b, 256b based on verified sequence determination $226_2$.

Driver signal generation module $234_3$ of B-side upper controller 164 receives verified sequence determination $226_3$ and outputs a series of driver sequence commands 240c. Driver sequence commands 240c may include, for example, driver sequence commands 242c, 244c, 246c, 248c, 250c, 252c, 254c, 256c. The timing of when each of driver sequence commands 242c, 244c, 246c, 248c, 250c, 252c, 254c, 256c is output corresponds to verified sequence determination $226_3$. Stated differently, driver signal generation module $234_3$ may determine when to output each of driver sequence commands 242c, 244c, 246c, 248c, 250c, 252c, 254c, 256c based on verified sequence determination $226_3$.

Driver signal generation module $234_4$ of B-side lower controller 166 receives verified sequence determination $226_4$ and outputs a series of driver sequence commands 240d. Driver sequence commands 240d may include, for example, driver sequence commands 242d, 244d, 246d, 248d, 250d, 252d, 254d, 256d. The timing of when each of driver sequence commands 242d, 244d, 246d, 248d, 250d, 252d, 254d, 256d is output corresponds to verified sequence determination $226_4$. Stated differently, driver signal generation module $234_4$ may determine when to output each of driver sequence commands 242d, 244d, 246d, 248d, 250d, 252d, 254d, 256d based on verified sequence determination $226_4$.

In various embodiments, each driver signal generation module $234_1$, $234_2$, $234_3$, $234_4$, may receive its respective verified sequence determination $226_1$, $226_2$, $226_3$, $226_4$, from its respective synchronization module $228_1$, $228_2$, $228_3$, $228_4$. Synchronization modules $228_1$, $228_2$, $228_3$, $228_4$ may be configured to simultaneously send the verified sequence determinations $226_1$, $226_2$, $226_3$, $226_4$ to their respective driver signal generation module $234_1$, $234_2$, $234_3$, $234_4$.

In accordance with various embodiments, sequencer system 112 may include A-side fore-aft EED driver module 170 and B-side fore-aft EED driver module 172. A-side fore-aft EED driver module 170 may be configured to receive driver sequence commands 240a from A-side upper controller 160 and driver sequence commands 240b from A-side lower controller 162. B-side fore-aft EED driver module 172 may be configured to receive driver sequence commands 240c from B-side upper controller 164 and driver sequence commands 240d from B-side lower controller 166.

In various embodiments. A-side fore-aft EED driver module 170 may include one or more A-side EED drivers such as, for example, A-side EED drivers 260a, 262a, 264a, 266a, 268a, 270a, 272a, 274a. A-side upper controller 160 may output driver sequence commands 242a, 244a, 246a, 248a, 250a, 252a, 254a, 256a, respectively to A-side EED drivers 260a, 262a, 264a, 266a, 268a, 270a, 272a, 274a. A-side lower controller 162 may output driver sequence commands 242b, 244b, 246b, 248b, 250b, 252b, 254b, 256b, respectively, to A-side EED drivers 260a, 262a, 264a, 266a, 268a, 270a, 272a, 274a.

In response to receiving driver sequence command 242a and driver sequence command 242b, A-side EED driver 260a may output firing signal 280a to an ejection system subcomponent 282. In various embodiments, ejection system subcomponent 282 may be a first forward canopy driver of forward canopy drivers 114 in FIG. 1. A-side EED driver 260a may be configured to output firing signal 280a only if both driver sequence command 242a and driver sequence command 242b are received and only if driver sequence command 242a matches driver sequence command 242b, which tends to prevent unintentional firing of ejection system subcomponent 282.

In response to receiving driver sequence command 244a and driver sequence command 244b, A-side EED driver 262a may output firing signal 284a to an ejection system subcomponent 286. In various embodiments, ejection system subcomponent 286 may be a second forward canopy driver of forward canopy drivers 114 in FIG. 1. A-side EED driver 262a may be configured to output firing signal 284a only if both driver sequence command 244a and driver sequence command 244b are received and only if driver sequence command 244a matches driver sequence command 244b, which tends to prevent unintentional firing of ejection system subcomponent 286.

In response to receiving driver sequence command 246a and driver sequence command 246b, A-side EED driver 264a may output firing signal 288a to an ejection system subcomponent 290. In various embodiments, ejection system subcomponent 290 may be a forward catapult driver (e.g., forward catapult driver 118 in FIG. 1). A-side EED driver 264a may be configured to output firing signal 288a only if both driver sequence command 246a and driver sequence command 246b are received and only if driver sequence command 246a matches driver sequence command 246b, thereby tending to prevent unintentional firing of ejection system subcomponent 290.

In response to receiving driver sequence command 248a and driver sequence command 248b, A-side EED driver 266a may output firing signal 292a to an ejection system subcomponent 294. In various embodiments, ejection system subcomponent 294 may be a forward CKU driver. A-side EED driver 266a may be configured to output firing signal 292a only if both driver sequence command 248a and driver sequence command 248b are received and only if driver sequence command 248a matches driver sequence command 248b, thereby tending to prevent unintentional firing of ejection system subcomponent 294.

In response to receiving driver sequence command 250a and driver sequence command 250b, A-side EED driver 268a may output firing signal 296a to an ejection system subcomponent 298. In various embodiments, ejection system subcomponent 298 may be a first aft canopy driver of aft canopy drivers 18 in FIG. 1. A-side EED driver 268a may be configured to output firing signal 296a only if both driver sequence command 250a and driver sequence command 250b are received and only if driver sequence command 250a matches driver sequence command 250b, thereby tending to prevent unintentional firing of ejection system subcomponent 298.

In response to receiving driver sequence command 252a and driver sequence command 252b, A-side EED driver 270a may output firing signal 300a to an ejection system subcomponent 302. In various embodiments, ejection system subcomponent 302 may be a second aft canopy driver of aft canopy drivers 18 in FIG. 1. A-side EED driver 270a may be configured to output firing signal 300a only if both driver sequence command 252a and driver sequence command 252b are received and only if driver sequence command 252a matches driver sequence command 252b, thereby tending to prevent unintentional firing of ejection system subcomponent 302.

In response to receiving driver sequence command 254a and driver sequence command 254b, A-side EED driver 272a may output firing signal 304a to an ejection system subcomponent 306. In various embodiments, ejection system subcomponent 306 may be an aft catapult driver (e.g., aft catapult driver 20 in FIG. 1). A-side EED driver 272a may be configured to output firing signal 304a only if both driver sequence command 254a and driver sequence command 254b are received and only if driver sequence command 254a matches driver sequence command 254b, thereby tending to prevent unintentional firing of ejection system subcomponent 306.

In response to receiving driver sequence command 256a and driver sequence command 256b, A-side EED driver 274a may output firing signal 308a to an ejection system subcomponent 310. In various embodiments, ejection system subcomponent 310 may be an aft CKU driver. A-side EED driver 274a may be configured to output firing signal 308a only if both driver sequence command 256a and driver sequence command 256b are received and only if driver sequence command 256a matches driver sequence command 256b, thereby tending to prevent unintentional firing of ejection system subcomponent 306.

B-side fore-aft EED driver module 172 may include one or more B-side EED drivers such as, for example, B-side EED drivers 260b, 262b, 264b, 266b, 268b, 270b, 272b, 274b. B-side upper controller 164 may output driver sequence commands 242c, 244c, 246c, 248c, 250c, 252c, 254c, 256c, respectively to B-side EED drivers 260b, 262b, 264b, 266b, 268, 270b, 272b, 274b. B-side lower controller 166 may output driver sequence commands 242d, 244d, 246d, 248d, 250d, 252d, 254d, 256d, respectively, to B-side EED drivers 260b, 262b, 264b, 266b, 268b, 270b, 272b, 274b.

In response to receiving driver sequence command 242c and driver sequence command 242d, B-side EED driver 260b may output firing signal 280b to ejection system subcomponent 282 (i.e., to the same ejection system subcomponent as output firing signal 280a from A-side EED driver 260a). B-side EED driver 260b may be configured to output firing signal 280b only if both driver sequence command 242c and driver sequence command 242d are received and only if driver sequence command 242c matches driver sequence command 242d, thereby tending to prevent unintentional firing of ejection system subcomponent 282.

In response to receiving driver sequence command 244c and driver sequence command 244d, B-side EED driver 262b may output firing signal 284b to ejection system subcomponent 286. B-side EED driver 262b may be configured to output firing signal 284b only if both driver sequence command 244c and driver sequence command 244d are received and only if driver sequence command 244c matches driver sequence command 244d, thereby tending to prevent unintentional firing of ejection system subcomponent 286.

In response to receiving driver sequence command 246c and driver sequence command 246d, B-side EED driver 264b may output firing signal 288b to ejection system subcomponent 290. B-side EED driver 264b may be configured to output firing signal 288b only if both driver sequence command 246c and driver sequence command 246d are received and only if driver sequence command 246c matches driver sequence command 246d, thereby tending to prevent unintentional firing of ejection system subcomponent 290.

In response to receiving driver sequence command 248c and driver sequence command 248d, B-side EED driver 266b may output firing signal 292b to ejection system subcomponent 294. B-side EED driver 266b may be configured to output firing signal 292b only if both driver sequence command 248c and driver sequence command 248d are received and only if driver sequence command 248c matches driver sequence command 248d, thereby tending to prevent unintentional firing of ejection system subcomponent 294.

In response to receiving driver sequence command 250c and driver sequence command 250d, B-side EED driver 268b may output firing signal 296b to ejection system subcomponent 298. B-side EED driver 268b may be configured to output firing signal 296b only if both driver sequence command 250c and driver sequence command 250d are received and only if driver sequence command 250c matches driver sequence command 250d, thereby tending to prevent unintentional firing of ejection system subcomponent 298.

In response to receiving driver sequence command 252c and driver sequence command 252d, B-side EED driver 270b may output firing signal 300b to ejection system subcomponent 302. B-side EED driver 270b may be configured to output firing signal 300b only if both driver sequence command 252c and driver sequence command 252d are received and only if driver sequence command 252c matches driver sequence command 252d, thereby tending to prevent unintentional firing of ejection system subcomponent 302.

In response to receiving driver sequence command 254c and driver sequence command 254d, B-side EED driver 272b may output firing signal 304b to ejection system subcomponent 306. B-side EED driver 272b may be configured to output firing signal 304b only if both driver sequence command 254c and driver sequence command 254d are received and only if driver sequence command 254c matches driver sequence command 254d, thereby tending to prevent unintentional firing of ejection system subcomponent 306.

In response to receiving driver sequence command 256c and driver sequence command 256d, B-side EED driver 274c may output firing signal 308c to ejection system subcomponent 310. B-side EED driver 274b may be configured to output firing signal 308b only if both driver sequence command 256c and driver sequence command 256d are received and only if driver sequence command 256c matches driver sequence command 256d, thereby tending to prevent unintentional firing of ejection system subcomponent 310.

The timing for sending each of the driver sequence commands 242a, 244a, 246a, 248a, 250a, 252a, 254a, 256a from A-side upper controller 160 should match the timing for sending driver sequence commands 242b, 244b, 246b, 248b, 250b, 252b, 254b, 256b from A-side lower controller 162, the timing for sending each of the driver sequence commands 242c, 244c, 246c, 248c, 250c, 252c, 254c, 256c from B-side upper controller 164, and the timing for sending driver sequence commands 242d, 244d, 246d, 248d, 250d, 252d, 254d, 256d from B-side lower controller 166 due the two out of three voting scheme producing matching verified sequence determinations $226_1$, $226_2$, $226_3$, and $226_4$.

Determining verified ejection sequences $226_1$, $226_2$ $226_1$, $226_2$ using the two of three voting scheme, as described above, provides redundancy allowing operation in the presence of a single system failure and increasing the likelihood that sequencer system 112 operates correctly and/or that the timing sequence for outputting driver sequence commands 240a to A-side fore-aft EED driver module 170, the timing sequence for outputting driver sequence commands 240b to A-side fore-aft EED driver module 170, the timing sequence for outputting driver sequence commands 240c to B-side fore-aft EED driver module 172, and the timing sequence for outputting driver sequence commands 240d to B-side fore-aft EED driver module 172 are consistent with one another. In this regard, sequencer system 112 is configured to fire only when desired and to prevent, or reduce a probability, of an unintentional firing.

Returning to FIG. 1, aircraft ejection assembly 100 may further include a sequencer system 122. In various embodiments, sequencer system 122 may be an ejection seat sequencer system configured to determine and control the timing (i.e., sequence) for firing subsystems of first ejection seat 104. Sequencer system 122 may be located on or within first ejection seat 104. In various embodiments, aircraft ejection assembly 100 may further include a sequencer system 123 located on or within second ejection seat 14.

Sequencer system 123 may be an ejection seat sequencer system configured to determine and control the timing (i.e., sequence) for firing subsystems of second ejection seat 14.

Figure 2:
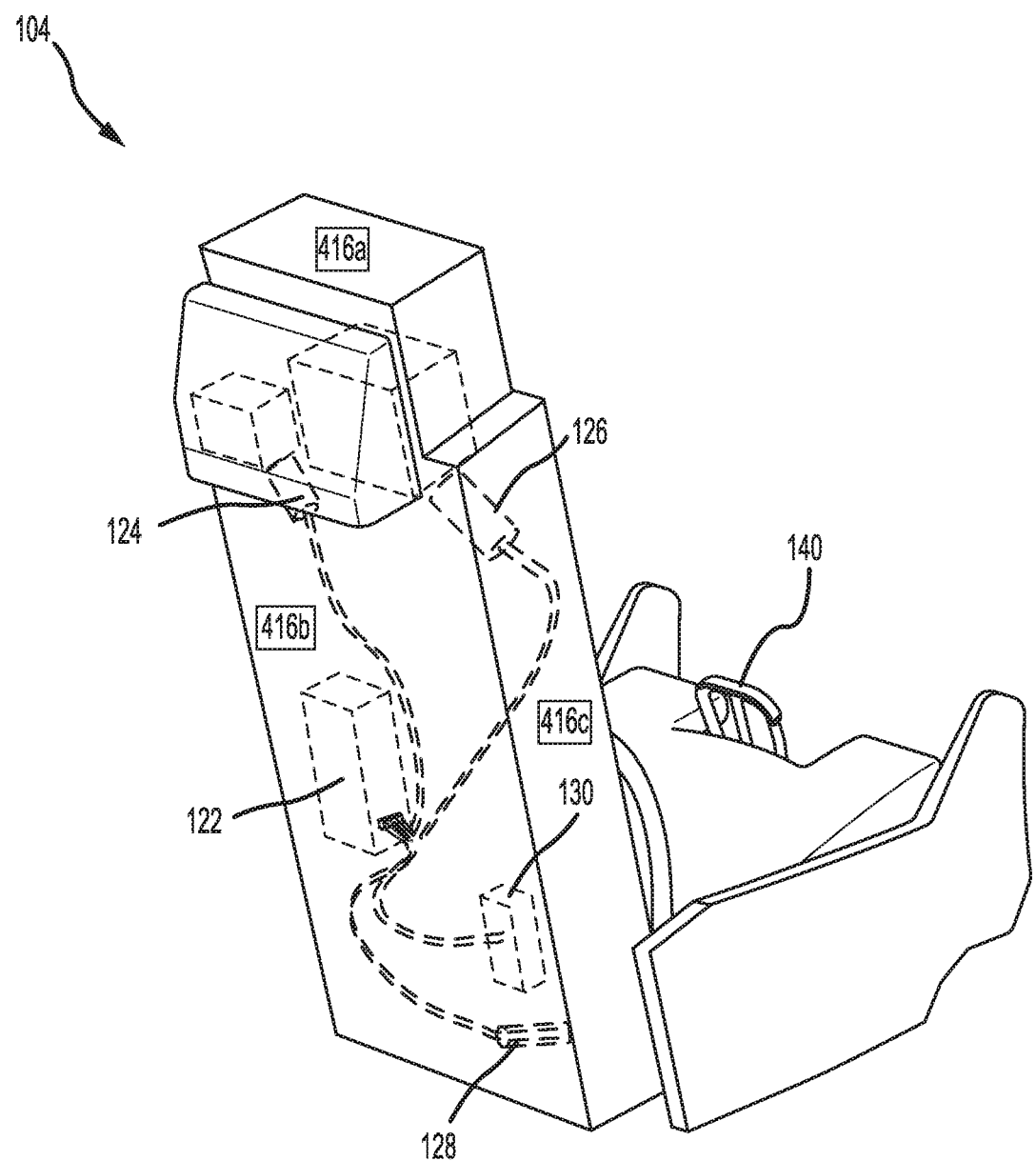
FIG. 2 illustrates a perspective view of an ejection seat, in accordance with various embodiments.

With reference to FIG. 2, first ejection seat 104 including sequencer system is illustrated. While FIGS. 2 and 4 describe features of first ejection seat 104 and sequencer system 122, it is contemplated and understood that second ejection seat 14 and sequencer system 123, with momentary reference to FIG. 1, may include the elements and functionalities as described herein with reference to first ejection seat 104 and sequencer system 122, respectively.

In accordance with various embodiments, sequencer system 122 is configured to determine and control the timing (i.e., sequence) for firing subsystems of first ejection seat 104. For example, sequencer system 122 may control the firing of drogue parachute mortar(s) 124, parachute mortar(s) 126, restraint release thruster(s) 128, rocket motor and stability package (STAPAC) 130, and/or other subsystems of first ejection seat 104.

Figure 4:
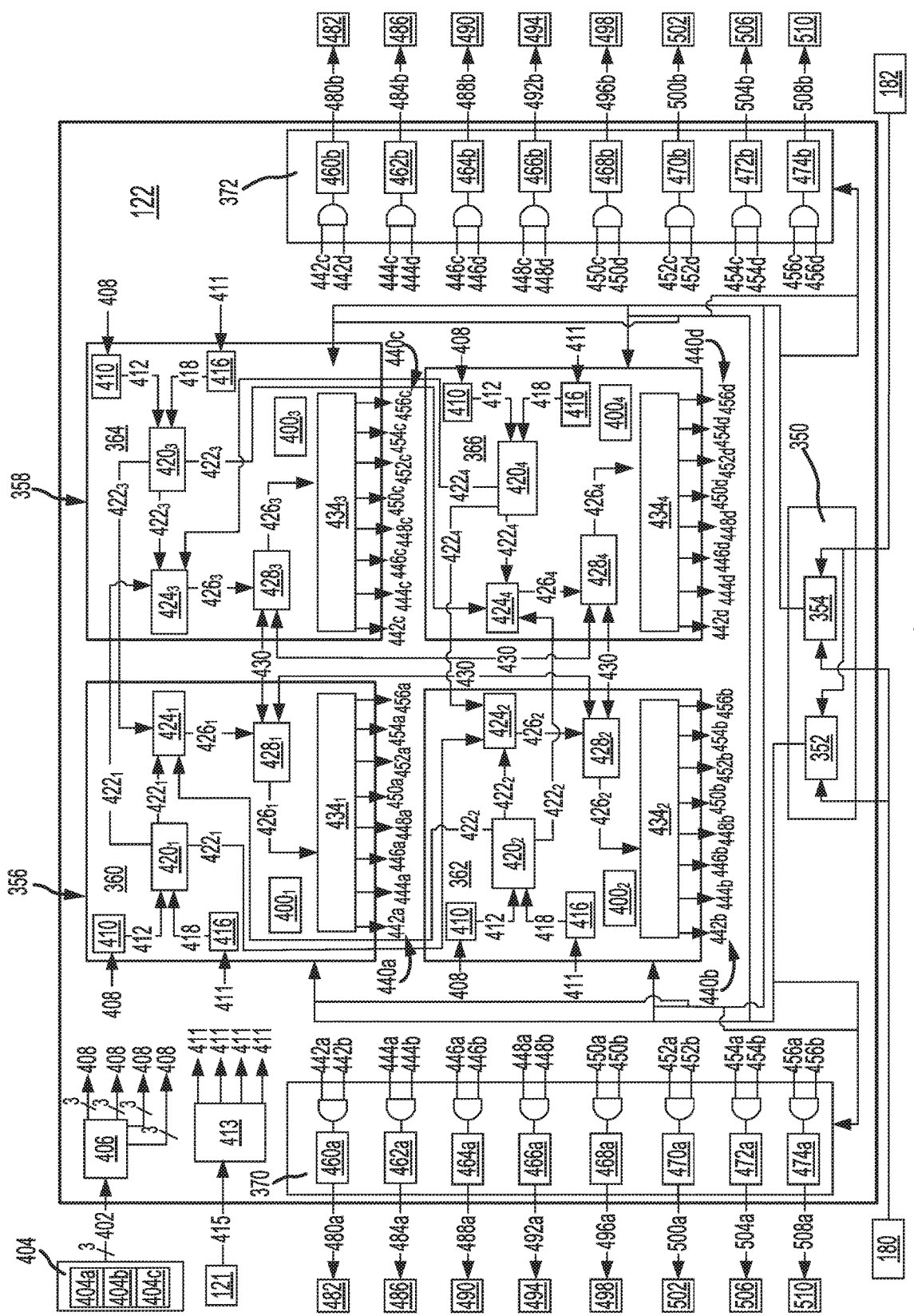
FIG. 4 illustrates a sequencer system of an ejection assembly, in accordance with various embodiments.

With reference to FIG. 4, a schematic of sequencer system 122 is illustrated. As described below, sequencer system 122 may be configured to operate in a manner similar to sequencer system 112 in FIG. 3. In this regard, sequencer system 122 may include four controllers with each controller configured to determine an initial sequence and a verified ejection sequence using a two of three voting system, wherein the initial sequence determination of each controller is compared to the initial sequence determination of the same side controller and the initial sequence determination of one of the cross-side controllers.

In accordance with various embodiments, sequencer system 122 may include a power circuit 350. Power circuit 350 may include a first logic power module 352 and a second logic power module 354. First and second logic power modules 352, 354 may each be configured to provide power to a first set of controllers 356 of sequencer system 122 (also referred to herein as "A-side controllers 356") and a second set of controllers 358 of sequencer system 122 (also referred to herein as "B-side controllers 354"). The A-side controllers 356 may include a first A-side controller 360 (also referred to as A-side upper controller 360) and a second A-side controller 362 (also referred to as A-side lower controller 362). The B-side controllers 358 may include a first B-side controller 364 (also referred to as B-side upper controller 364) and a second B-side controller 366 (also referred to as B-side lower controller 366).

First and second logic power modules 352, 354 may each be configured to also provide power to an A-side (or first) fore-aft electronic explosive device (EED) driver module 370 of sequencer system 122 and a B-side (or second) fore-aft EED driver module 372 of sequencer system 122. A-side fore-aft EED driver module 370 is configured to receive sequence commands from A-side controllers 356. B-side fore-aft EED driver module 372 is configured to receive sequence commands from B-side controllers 358. Sequencer system 122 including two logic power modules (i.e., first logic power module 352 and second logic power module 354) provides a redundancy. In this regard, should one of first logic power module 352 or second logic power module 354 fail, the other of first logic power module 352 and second logic power module 354 provides power to A-side controllers 356, B-side controllers 358, A-side fore-aft EED driver module 370, and B-side fore-aft EED driver module 372.

In various embodiments, first external power source 180 and second external power source 182 may be configured to provide power to power circuit 350. Each of first external power source 180 and second external power source 182 may be electrically coupled to both first logic power module 352 and second logic power module 354. In this regard, should one of first external power source 180 or second external power source 182 fail, the other of first external power source 180 and second external power source 182 provides power to both first logic power module 352 and second logic power module 354. In various embodiments, the same first and second external power source may power power circuit 350 and power circuit 150 in FIG. 3. In various embodiments, a first set of first and second external power sources may power power circuit 350 a second set of first and second external power sources, different from the first set may power power circuit 150.

In various embodiments, first external power source 180 and second external power source 182 may be configured to activate in response to initiation of an ejection sequence. For example, first external power source 180 and second external power source 182 may be activated in response to actuation of handle 140, with momentary reference to FIG. 2. Upon activation, first external power source 180 and second external power source 182 provide electricity (e.g., current) to power circuit 350. In various embodiments, first external power source 180 and second external power source 182 may each comprise a thermal battery configured to activate in response to initiation of the ejection sequence (e.g., in response to actuation of handle 140, or other ejection initiating event). For example, initiation of the ejection sequence may cause a chemical reaction within the thermal battery. The chemical reaction generates electricity that is provided to first and second logic power modules 352, 354.

A-side upper controller 360, A-side lower controller 362, B-side upper controller 364, and B-side lower controller 366 (collectively controllers 360, 362, 364, 366) may each include one or more processors and one or more tangible, non-transitory memories $400_1$, $400_2$, $400_3$, $400_4$, respectively, and may be capable of implementing logic. The processor(s) can be general purpose processor(s), DSPs, ASICs, FPGAs or other programmable logic devices, discrete gates or transistor logics, discrete hardware components, or a combination thereof. As discussed in further detail below, controllers 360, 362, 364, 366 may be configured to each make an initial ejection sequence determination based on ejection data received by the controller and a verified ejection seat determination based on a comparison the between the controller's initial ejection sequence determination and the initial ejection sequence determination of two of the other controllers. In accordance with various embodiments, the two other controllers may include one controller from the same side (e.g., A-side 356 or B-side 358) and one controller from the cross-side (i.e., the other of A-side 356 or B-side 358). In this regard, controllers 360, 362, 364, 366 may verify that the timing sequence output from each controller is consistent with (i.e., matches) the timing sequence output by each of the other controllers.

In various embodiments, in response to activation of first and second logic power modules 352, 354, controllers 360, 362, 364, 366 may receive one or sensors signals 402. Sensors signals 402 may be output by one or more sensors 404. In various embodiment, sensor signals 402 may be pressure signals output from a base (or first) pressure sensor 404a, a left (or second) pressure sensor 404b, and a right (or third) pressure sensor 404c. Base pressure sensor 404a, left pressure sensor 404b, and right pressure sensor 404c may be located at various locations along first ejection seat 104 (FIG. 2). The locations of sensors 404 may be selected to such that sensor signals 402 can be used to determine an altitude and an orientation of first ejection seat 104. Sensor signals 402 may convey a real-time pressure or real-time pressure differential measured by sensor(s) 404. Sensor signals 402 may be received by a signal conditioner and converter (SCC) module 406 of sequencer system 122. SCC module 406 may include an analog to digital signal converter, one or more high pass filters, low pass filters, signal amplifiers, or any other desired signal conditioners.

SCC module 406 may output conditioned and converted sensor signals 408 to each of controllers 360, 362, 364, 366. In various embodiments, each of the conditioned and converted sensor signals 408 output from SCC module 406 may correspond to a signal output from a sensor 404. For example, SCC module 406 may output a first conditioned and converted sensor signal 408 corresponding to a sensor signal 402 from base pressure sensor 404a, a second conditioned and converted sensor signal 408 corresponding to a sensor signal 402 from left pressure sensor 404b, and/or a third conditioned and converted sensor signal 408 corresponding to a sensor signal 402 from right pressure sensor 404c to each of controllers 360, 362, 364, 366.

Conditioned and converted sensor signals 408 may be received by a sensor signal processor 410 of each controller 360, 362, 364, 366. Sensor signal processor 410 may be configured to receive and decipher conditioned and converted sensor signals 408 and determine a real-time altitude based on conditioned and converted sensor signals 408. Sensor signal processor 410 may output an altitude signal 412 (for example, a high-altitude, normal altitude, low altitude, etc.) corresponding to the determined altitude. Altitude signal 412 may be received by an initial sequence determination module $420_1$, $420_2$, $420_3$, $420_4$ of each controller 360, 362, 364, 366.

In various embodiments, controllers 360, 362, 364, 366 may each also receive a sequence start signal(s) 411. Sequence start signal(s) 411 may be output from a sequence starter interface 413 of sequencer system 122. Sequence starter interface 413 may output sequence start signal(s) 411 in response to a sequence initiation signal 415 output from one or more rail switch(es) 121. In various embodiments, rail switch(es) 121 may be located on rails 120 with momentary reference to FIG. 1. Rail switch(es) 121 may output sequence initiation signal 415 in response to first ejection seat 104 translating along rails 120 and actuating rail switch(es) 121 and/or in response to any other event indicating that the expulsion of first ejection seat 104 from cockpit 108 has begun. Sequence starter interface 413 may provide signal conditioning of sequence initiation signal 415. For example, sequence starter interface 413 may include one or more high pass filters, low pass filters, signal amplifiers, or any other desired signal conditioners.

Sequence start signal(s) 411 may be received by a start switch signal processor 416 of each controller 360, 362, 364, 366. Start switch signal processor 416 may be configured to receive and decipher sequence start signal(s) 411 and determine a start sequence based on sequence start signal(s) 411. Start switch signal processor 416 may output a start sequence signal 418 corresponding to the determined start sequence. Start sequence signal 418 may be received by the initial sequence determination modules $420_1$, $420_2$, $420_3$, $420_4$ of each controller 360, 362, 364, 366.

In accordance with various embodiments, initial sequence determination modules $420_1$, $420_2$, $420_3$, $420_4$ may each make an initial sequence determination $422_1$, $422_2$, $422_3$, $422_4$, respectively, based on altitude signal 412 and start sequence signal 418. In various embodiment, initial sequence determination modules $420_1$, $420_2$, $420_3$, $420_4$ may also be configured use real time data and/or stored data corresponding to the type of aircraft in which sequencer system 122 is installed, the current aircraft conditions (e.g., GPS, aircraft speed, weather condition, etc.), the current seat conditions (e.g., speed, velocity, attachment to aircraft, etc.), the type of ejection seat in which sequencer system 122 is installed, the location of the ejection seat within the aircraft (e.g., forward, aft, left, right, etc.), or any other info which may affect the timing for firing each of the ejection seat subsystems (i.e., the sequence determination).

In accordance with various embodiments, each initial sequence determination $422_1$, $422_2$, $422_3$, $422_4$ is a timing schedule (or time delay) for firing the ejection seat subsystems (e.g., for firing drogue parachute mortar(s) 124, parachute mortar(s) 126, restraint release thruster(s) 128, rocket motor and stability package (STAPAC) 130 in FIG. 2).

In accordance with various embodiments, the initial sequence determinations $422_1$, $422_2$, $422_3$, $422_4$ from initial sequence determination modules $420_1$, $420_2$, $420_3$, $420_4$ may be sent to a comparison module $424_1$, $424_2$, $424_3$, $424_4$ in that controller and to the comparison module $424_1$, $424_2$, $424_3$, $424_4$ of the same side controller and to the comparison module $424_1$, $424_2$, $424_3$, $424_4$ of one of the cross-side controllers. For example, in various embodiments, the initial sequence determination $422_1$ generated by A-side upper controller 360 is sent to comparison module $424_2$ of A-side lower controller 362 and to comparison module $424_3$ of B-side upper controller 364. The initial sequence determination $422_3$ generated by B-side upper controller 364 is sent to comparison module $424_4$ of B-side lower controller 366 and comparison module $424_1$ of A-side upper controller 360. The initial sequence determination $422_2$ generated by A-side lower controller 362 is sent to comparison module $424_4$ of B-side lower controller 366 and comparison module $424_1$ of A-side upper controller 360. The initial sequence determination $422_4$ generated by B-side lower controller 366 is sent to comparison module $424_3$ of B-side upper controller 364 and comparison module $424_4$ of A-side lower controller 362.

Each controller 360, 362, 364, 366 compares its initial sequence determination $422_1$, $422_2$, $422_3$, $422_4$ to the two initial sequence determinations received from the same side and cross-side controllers. Each comparison module $424_1$, $424_2$, $424_3$, $424_4$ of controllers 360, 362, 364, 366 then determines a verified (or actual) sequence determination $426_1$, $426_2$, $426_3$, $426_4$, respectively, based on the comparison. In accordance with various embodiments, the controller comparison modules $424_1$, $424_2$, $424_3$, $424_4$ may employ a two of three voting scheme to determine the verified sequence determinations $426_1$, $426_2$, $426_3$, $426_4$.

In various embodiments, comparison module $424_1$ of A-side upper controller 360 may make its verified sequence determination $426_1$ using a two of three voting scheme based on its initial sequence determinations $422_1$ and the initial sequence determinations $422_2$ from A-side lower controller 362 and the initial sequence determinations $422_3$ from B-side upper controller 364. For example, if the comparison module $424_1$ of A-side upper controller 360 determines that the initial sequence determination $422_1$ of A-side upper controller 360 matches (i.e., is the same timing sequence as) either of the initial sequence determination $422_2$ generated by A-side lower controller 362 or the initial sequence determination $422_3$ generated by B-side upper controller 364, then comparison module $424_1$ of A-side upper controller 360 outputs initial sequence determination $422_1$ as the verified sequence determination $426_1$. If the comparison module $424_1$ of A-side upper controller 360 determines that the initial sequence determination $422_3$ of B-side upper controller 364 matches the initial sequence determinations $422_2$ of A-side lower controller 362, but that the initial sequence determination $422_1$ of A-side upper controller 360 does not match (i.e., is a different timing sequence than) the initial sequence determination $422_2$ generated by A-side lower controller 362 and the initial sequence determination $422_3$ generated by B-side upper controller 364, then comparison module $424_1$ outputs the initial sequence determinations $422_2$, $422_3$ of A-side lower controller 362 and B-side upper controller 364 as verified sequence determination $426_1$.

If comparison module $424_1$ of A-side upper controller 360 determines the initial sequence determination $422_1$ of A-side upper controller 360 is different from initial sequence determination $422_2$ of A-side lower controller 362 and from initial sequence determinations $422_3$ of B-side upper controller 364 and that initial sequence determination $422_2$ is different from initial sequence determinations $422_3$ (i.e., if none of the three initial sequence determinations $422_1$, $422_2$, $422_3$ match), then comparison module $424_1$ of A-side upper controller 360 outputs a default ejection sequence as verified sequence determination $426_1$.

Comparison module $424_2$ of A-side lower controller 362 may make its verified sequence determination $426_2$ using a two of three voting scheme based on initial sequence determination $422_2$ and the initial sequence determination $422_1$ from A-side upper controller 360 and the initial sequence determination $422_4$ from B-side lower controller 366. For example, if comparison module $424_2$ determines the initial sequence determination $422_2$ of A-side lower controller 362 matches (i.e., is the same timing sequence as) either of the initial sequence determination $422_4$ generated by B-side lower controller 366 or the initial sequence determination $422_1$ generated by A-side upper controller 360, then comparison module $424_2$ of A-side lower controller 362 outputs initial sequence determination $422_2$ as verified sequence determination $426_2$. If comparison module $424_2$ of A-side lower controller 362 determines that the initial sequence determination $422_4$ generated by B-side lower controller 366 matches the initial sequence determination $422_1$ generated by A-side upper controller 360 and that the initial sequence determination $422_2$ of A-side lower controller 362 does not match the initial sequence determinations $422_1$, $422_4$ of A-side upper controller 360 and B-side lower controller 366, then comparison module $424_2$ of A-side lower controller 362 outputs the initial sequence determinations $422_1$, $422_4$ of A-side upper controller 360 and B-side lower controller 366 as the verified sequence determination $426_2$.

If comparison module $424_2$ of A-side lower controller 362 determines the initial sequence determination $422_2$ of A-side lower controller 362 is different from initial sequence determination $422_1$ of A-side upper controller 360 and from the initial sequence determination $422_4$ of B-side lower controller 366 and that A-side upper initial sequence determination $422_1$ is different from B-side lower initial sequence determinations $422_4$ (i.e., if none of the three initial sequence determinations $422_1$, $422_2$, $422_4$ match), then comparison module $424_2$ of A-side lower controller 362 outputs a default ejection sequence as verified sequence determination $426_2$.

Comparison module $424_3$ of B-side upper controller 364 may make its verified sequence determination $426_3$ using a two of three voting scheme based on its initial sequence determinations $422_3$ and the initial sequence determinations $422_1$ from A-side upper controller 360 and the initial sequence determinations $422_4$ from B-side lower controller 366. For example, if the initial sequence determination $422_3$ of B-side upper controller 364 matches (i.e., is the same timing sequence as) either of the initial sequence determination $422_4$ generated by B-side lower controller 366 or the initial sequence determination $422_1$ generated by A-side upper controller 360, then comparison module $424_3$ of B-side upper controller 364 outputs the initial sequence determination $422_3$ of B-side upper controller 364 as verified sequence determination $426_3$. If comparison module $424_3$ of B-side upper controller 364 determines that the initial sequence determination $422_4$ generated by B-side lower controller 366 matches the initial sequence determination $422_1$ generated by A-side upper controller 360 and that the initial sequence determination $422_3$ of B-side upper controller 364 does not match the initial sequence determinations $422_1$, $422_4$ of A-side upper controller 360 and B-side lower controller 366, then comparison module $424_3$ of B-side upper controller 364 outputs the initial sequence determinations $422_1$, $422_4$ of A-side upper controller 360 and B-side lower controller 366 as the verified sequence determination $426_3$.

If comparison module $424_3$ of B-side upper controller 364 determines the initial sequence determination $422_3$ of B-side upper controller 364 is different from initial sequence determination $422_1$ of A-side upper controller 360 and from initial sequence determinations $422_4$ of B-side lower controller 366 and that A-side upper initial sequence determination $422_1$ is different from B-side lower initial sequence determination $422_4$ (i.e., if none of the three initial sequence determinations $422_1$, $422_3$, $422_4$ match), then comparison module $424_3$ of B-side upper controller 364 outputs a default ejection sequence as verified sequence determination $426_3$.

Comparison module $424_4$ of B-side lower controller 366 may make its verified sequence determination $426_4$ using a two of three voting scheme based on its initial sequence determinations $422_4$ and the initial sequence determinations $422_2$ from A-side lower controller 362 and the initial sequence determinations $422_3$ from B-side upper controller 364. For example, if the comparison module $424_4$ of B-side lower controller 366 determines that the initial sequence determination $422_4$ matches (i.e., is the same timing sequence as) either of the initial sequence determination $422_2$ generated by A-side lower controller 362 or the initial sequence determination $422_3$ generated by B-side upper controller 364, then comparison module $424_4$ of B-side lower controller 366 outputs initial sequence determination $422_4$ as the verified sequence determination $426_4$. If the comparison module $424_4$ determines that the initial sequence determination $422_3$ of B-side upper controller 364 matches the initial sequence determinations $422_2$ of A-side lower controller 362, but that the initial sequence determination $422_4$ of B-side lower controller 366 does not match (i.e., is a different timing sequence than) the initial sequence determinations $422_2$, $422_3$ generated by A-side lower controller 362 and B-side upper controller 364, then comparison module $424_4$ outputs the initial sequence determinations $422_2$, $422_3$ of A-side lower controller 362 and B-side upper controller 364 as verified sequence determination $426_4$.

If comparison module $424_4$ of B-side lower controller 366 determines the initial sequence determination $422_4$ of B-side lower controller 366 is different from initial sequence determination $422_2$ of A-side lower controller 362 and from initial sequence determinations $422_3$ of B-side upper controller 364 and that initial sequence determination $422_2$ is different from initial sequence determinations $422_3$ (i.e., if none of the three initial sequence determinations $422_2$, $422_3$, $422_4$ match), then comparison module $424_4$ of B-side lower controller 366 outputs a default ejection sequence as verified sequence determination $426_4$.

Controllers 360, 362, 364, 366 may each include a synchronization module $428_1$, $428_2$, $428_3$, $428_4$, respectively. Verified sequence determination $426_1$, $426_2$, $426_3$, $426_4$ may be sent, respectively, to synchronization modules $428_1$, $428_2$, $428_3$, $428_4$. Timing outputs 430 may be sent between synchronization modules $428_1$, $428_2$, $428_3$, $428_4$ to coordinate an outputting of verified sequence determination $426_1$, $426_2$, $426_3$, $426_4$. Stated differently, synchronization modules $428_1$, $428_2$, $428_3$, $428_4$ may communicate with one another and may be configured to begin the ejection sequence corresponding to the verified sequence determinations $426_1$, $426_2$, $426_3$, $426_4$, at the same time. In various embodiments, the synchronization modules $428_1$, $428_2$, $428_3$, $428_4$ may communicate with the same two controllers employed in verified sequence determination. For example, in various embodiments, synchronization modules $428_1$ of A-side upper controller 360 may communicate with the synchronization module $428_2$ of A-side lower controller 362 and synchronization module $428_3$ of B-side upper controller 364, synchronization module $428_3$ of B-side upper controller 364 may communicate with the synchronization module $428_4$ of B-side lower controller 366 and synchronization module $428_1$ of A-side upper controller 360, etc.

Controllers 360, 362, 364, 366 may each include a driver signal generation module $434_1$, $434_2$, $434_3$, $434_4$, respectively. Driver signal generation modules $434_1$, $434_2$, $434_3$, $434_4$ may be configured to receive verified sequence determinations $426_1$, $426_2$, $426_3$, $426_4$ and output a series of driver sequence commands corresponding to the verified sequence determination. For example, driver signal generation module $434_1$ of A-side upper controller 360 receives verified sequence determination $426_1$ and outputs driver sequence commands 440a. Driver sequence commands 440a include, for example, driver sequence commands 442a, 444a, 446a, 448a, 450a, 452a, 454a, 456a. The timing of when each of driver sequence commands 442a, 444a, 446a, 448a, 450a, 452a, 454a, 456a is output corresponds to verified sequence determination $426_1$. Stated differently, driver signal generation module $434_1$ may determine when to output each of driver sequence commands 442a, 444a, 446a, 448a, 450a, 452a, 454a, 456a based on verified sequence determination $426_1$.

Driver signal generation module $434_2$ of A-side lower controller 362 receives verified sequence determination $426_2$ and outputs a series of driver sequence commands 440b. Driver sequence commands 440b may include, for example, driver sequence commands 442b, 444b, 446b, 448b, 450b, 452b, 454b, 456b. The timing of when each of driver sequence commands 442b, 444b, 446b, 448b, 450b, 452b, 454b, 456b is output corresponds to verified sequence determination $426_2$. Stated differently, driver signal generation module $434_2$ may determine when to output each of driver sequence commands 442b, 444b, 446b, 448b, 450b, 452b, 454b, 456b based on verified sequence determination $426_2$.

Driver signal generation module $434_3$ of B-side upper controller 364 receives verified sequence determination $426_3$ and outputs a series of driver sequence commands 440c. Driver sequence commands 440c may include, for example, driver sequence commands 442c, 444c, 446c, 448c, 450c, 452c, 454c, 456c. The timing of when each of driver sequence commands 442c, 444c, 446c, 448c, 450c, 452c, 454c, 456c is output corresponds to verified sequence determination $426_3$. Stated differently, driver signal generation module $434_3$ may determine when to output each of driver sequence commands 442c, 444c, 446c, 448c, 450c, 452c, 454c, 456c based on verified sequence determination 426₃.

Driver signal generation module 434₄ of B-side lower controller 366 receives verified sequence determination 426₄ and outputs a series of driver sequence commands 440d. Driver sequence commands 440d may include, for example, driver sequence commands 442d, 444d, 446d, 448d, 450d, 452d, 454d, 456d. The timing of when each of driver sequence commands 442d, 444d, 446d, 448d, 450d, 452d, 454d, 456d is output corresponds to verified sequence determination 426₄. Stated differently, driver signal generation module 434₄ may determine when to output each of driver sequence commands 442d, 444d, 446d, 448d, 450d, 452d, 454d, 456d based on verified sequence determination 426₄.

In various embodiments, each driver signal generation module 434₁, 434₂, 434₃, 434₄, may receive its respective verified sequence determination 426₁, 426₂, 426₃, 426₄, from its respective synchronization module 428₁, 428₂, 428₃, 428₄. Synchronization modules 428₁, 428₂, 428₃, 428₄ may be configured to simultaneously send the verified sequence determinations 426₁, 426₂, 426₃, 426₄ to their respective driver signal generation module 434₁, 434₂, 434₃, 434₄.

In accordance with various embodiments, sequencer system 122 may include A-side fore-aft EED driver module 370 and B-side fore-aft EED driver module 372. A-side fore-aft EED driver module 370 may be configured to receive driver sequence commands 440a from A-side upper controller 360 and driver sequence commands 440b from A-side lower controller 362. B-side fore-aft EED driver module 372 may be configured to receive driver sequence commands 440c from B-side upper controller 364 and driver sequence commands 440d from B-side lower controller 366. Determining verified ejection sequences 426₁, 426₂ 426₁, 426₂, as described above, provides a correction and redundancy to better ensure that the timing sequence for outputting driver sequence commands 440a to A-side fore-aft EED driver module 370, the timing sequence for outputting driver sequence commands 440b to A-side fore-aft EED driver module 370, the timing sequence for outputting driver sequence commands 440c to B-side fore-aft EED driver module 372, and the timing sequence for outputting driver sequence commands 440d to B-side fore-aft EED driver module 372 are consistent with one another.

In various embodiments. A-side fore-aft EED module 370 may include one or more A-side EED drivers such as, for example, A-side EED drivers 460a, 462a, 464a, 466a, 468a, 470a, 472a, 474a. A-side upper controller 360 may output driver sequence commands 442a, 444a, 446a, 448a, 450a, 452a, 454a, 456a, respectively to A-side EED drivers 460a, 462a, 464a, 466a, 468a, 470a, 472a, 474a. A-side lower controller 362 may output driver sequence commands 442b, 444b, 446b, 448b, 450b, 452b, 454b, 456b, respectively, to A-side EED drivers 460a, 462a, 464a, 466a, 468a, 470a, 472a, 474a.

In response to receiving driver sequence command 442a and driver sequence command 442b, A-side EED driver 460a may output firing signal 480a to an ejection seat subcomponent 482. In various embodiments, ejection seat subcomponent 482 may be drogue parachute mortar 124 in FIG. 2. A-side EED driver 460a may be configured to output firing signal 480a only if both driver sequence command 442a and driver sequence command 442b are received and only if driver sequence command 442a matches driver sequence command 442b, which tends to prevent unintentional firing of ejection seat subcomponent 482.

In response to receiving driver sequence command 444a and driver sequence command 444b, A-side EED driver 462a may output firing signal 484a to an ejection seat subcomponent 486. In various embodiments, ejection seat subcomponent 486 may be STAPAC driver 130 in FIG. 2. A-side EED driver 462a may be configured to output firing signal 484a only if both driver sequence command 444a and driver sequence command 444b are received and only if driver sequence command 444a matches driver sequence command 444b, which tends to prevent unintentional firing of ejection seat subcomponent 486.

In response to receiving driver sequence command 446a and driver sequence command 446b, A-side EED driver 464a may output firing signal 488a to an ejection seat subcomponent 490. In various embodiments, ejection seat subcomponent 490 may be parachute mortar 126. A-side EED driver 464a may be configured to output firing signal 488a only if both driver sequence command 446a and driver sequence command 446b are received and only if driver sequence command 446a matches driver sequence command 446b, thereby tending to prevent unintentional firing of ejection seat subcomponent 490.

In response to receiving driver sequence command 448a and driver sequence command 448b, A-side EED driver 466a may output firing signal 492a to an ejection seat subcomponent 494. In various embodiments, ejection seat subcomponent 494 may be a divergence thruster. A-side EED driver 466a may be configured to output firing signal 492a only if both driver sequence command 448a and driver sequence command 448b are received and only if driver sequence command 448a matches driver sequence command 448b, thereby tending to prevent unintentional firing of ejection seat subcomponent 494.

In response to receiving driver sequence command 450a and driver sequence command 450b, A-side EED driver 468a may output firing signal 496a to an ejection seat subcomponent 498. In various embodiments, ejection seat subcomponent 498 may be a first (or left) drogue severance cutter. A-side EED driver 468a may be configured to output firing signal 496a only if both driver sequence command 450a and driver sequence command 450b are received and only if driver sequence command 450a matches driver sequence command 450b, thereby tending to prevent unintentional firing of ejection seat subcomponent 498.

In response to receiving driver sequence command 452a and driver sequence command 452b, A-side EED driver 470a may output firing signal 500a to an ejection seat subcomponent 502. In various embodiments, ejection seat subcomponent 502 may be a second (or right) drogue severance cutter. A-side EED driver 470a may be configured to output firing signal 500a only if both driver sequence command 452a and driver sequence command 452b are received and only if driver sequence command 452a matches driver sequence command 452b, thereby tending to prevent unintentional firing of ejection seat subcomponent 502.

In response to receiving driver sequence command 454a and driver sequence command 454b, A-side EED driver 472a may output firing signal 504a to an ejection seat subcomponent 506. In various embodiments, ejection seat subcomponent 506 may be harness release thruster 128 in FIG. 2. A-side EED driver 472a may be configured to output firing signal 504a only if both driver sequence command 454a and driver sequence command 454b are received and only if driver sequence command 454a matches driver sequence command 454*b*, thereby tending to prevent unintentional firing of ejection seat subcomponent 506.

In response to receiving driver sequence command 456*a* and driver sequence command 456*b*, A-side EED driver 474*a* may output firing signal 508*a* to an ejection seat subcomponent 510. In various embodiments, ejection seat subcomponent 510 may be any additional desired ejection seat subsystem. A-side EED driver 474*a* may be configured to output firing signal 508*a* only if both driver sequence command 456*a* and driver sequence command 456*b* are received and only if driver sequence command 456*a* matches driver sequence command 456*b*, thereby tending to prevent unintentional firing of ejection seat subcomponent 510.

B-side fore-aft EED driver module 372 may include one or more B-side EED drivers such as, for example, B-side EED drivers 460*b*, 462*b*, 464*b*, 466*b*, 468*b*, 470*b*, 472*b*, 474*b*. B-side upper controller 364 may output driver sequence commands 442*c*, 444*c*, 446*c*, 448*c*, 450*c*, 452*c*, 454*c*, 456*c*, respectively to B-side EED drivers 460*b*, 462*b*, 464*b*, 466*b*, 468, 470*b*, 472*b*, 474*b*. B-side lower controller 366 may output driver sequence commands 442*d*, 444*d*, 446*d*, 448*d*, 450*d*, 452*d*, 454*d*, 456*d*, respectively, to B-side EED drivers 460*b*, 462*b*, 464*b*, 466*b*, 468*b*, 470*b*, 472*b*, 474*b*.

In response to receiving driver sequence command 442*c* and driver sequence command 442*d*, B-side EED driver 460*b* may output firing signal 480*b* to ejection seat subcomponent 482 (i.e., to the same ejection seat subcomponent as output firing signal 480*a* from A-side EED driver 460*a*). B-side EED driver 460*b* may be configured to output firing signal 480*b* only if both driver sequence command 442*c* and driver sequence command 442*d* are received and only if driver sequence command 442*c* matches driver sequence command 442*d*, thereby tending to prevent unintentional firing of ejection seat subcomponent 482.

In response to receiving driver sequence command 444*c* and driver sequence command 444*d*, B-side EED driver 462*b* may output firing signal 484*b* to ejection seat subcomponent 486. B-side EED driver 462*b* may be configured to output firing signal 484*b* only if both driver sequence command 444*c* and driver sequence command 444*d* are received and only if driver sequence command 444*c* matches driver sequence command 444*d*, thereby tending to prevent unintentional firing of ejection seat subcomponent 486.

In response to receiving driver sequence command 446*c* and driver sequence command 446*d*, B-side EED driver 464*b* may output firing signal 488*b* to ejection seat subcomponent 490. B-side EED driver 464*b* may be configured to output firing signal 488*b* only if both driver sequence command 446*c* and driver sequence command 446*d* are received and only if driver sequence command 446*c* matches driver sequence command 446*d*, thereby tending to prevent unintentional firing of ejection seat subcomponent 490.

In response to receiving driver sequence command 448*c* and driver sequence command 448*d*, B-side EED driver 466*b* may output firing signal 492*b* to ejection seat subcomponent 494. B-side EED driver 466*b* may be configured to output firing signal 492*b* only if both driver sequence command 448*c* and driver sequence command 448*d* are received and only if driver sequence command 448*c* matches driver sequence command 448*d*, thereby tending to prevent unintentional firing of ejection seat subcomponent 494.

In response to receiving driver sequence command 450*c* and driver sequence command 450*d*, B-side EED driver 468*b* may output firing signal 496*b* to ejection seat subcomponent 498. B-side EED driver 468*b* may be configured to output firing signal 496*b* only if both driver sequence command 450*c* and driver sequence command 450*d* are received and only if driver sequence command 450*c* matches driver sequence command 450*d*, thereby tending to prevent unintentional firing of ejection seat subcomponent 498.

In response to receiving driver sequence command 452*c* and driver sequence command 452*d*, B-side EED driver 470*b* may output firing signal 500*b* to ejection seat subcomponent 502. B-side EED driver 470*b* may be configured to output firing signal 500*b* only if both driver sequence command 452*c* and driver sequence command 452*d* are received and only if driver sequence command 452*c* matches driver sequence command 452*d*, thereby tending to prevent unintentional firing of ejection seat subcomponent 502.

In response to receiving driver sequence command 454*c* and driver sequence command 454*d*, B-side EED driver 472*b* may output firing signal 504*b* to ejection seat subcomponent 506. B-side EED driver 472*b* may be configured to output firing signal 504*b* only if both driver sequence command 454*c* and driver sequence command 454*d* are received and only if driver sequence command 454*c* matches driver sequence command 454*d*, thereby tending to prevent unintentional firing of ejection seat subcomponent 506.

In response to receiving driver sequence command 456*c* and driver sequence command 456*d*, B-side EED driver 474*c* may output firing signal 508*c* to ejection seat subcomponent 510. B-side EED driver 474*b* may be configured to output firing signal 508*b* only if both driver sequence command 456*c* and driver sequence command 456*d* are received and only if driver sequence command 456*c* matches driver sequence command 456*d*, thereby tending to prevent unintentional firing of ejection seat subcomponent 510.

The timing for sending each of the driver sequence commands 442*a*, 444*a*, 446*a*, 448*a*, 450*a*, 452*a*, 454*a*, 456*a* from A-side upper controller 360 and driver sequence commands 442*b*, 444*b*, 446*b*, 448*b*, 450*b*, 452*b*, 454*b*, 456*b* from A-side lower controller 362 to A-side fore-aft EED driver module 370 corresponds to matching verified sequence determinations $426_1$, $426_2$. The timing for sending each of the driver sequence commands 442*c*, 444*c*, 446*c*, 448*c*, 450*c*, 452*c*, 454*c*, 456*c* from B-side upper controller 364 and driver sequence commands 442*d*, 444*d*, 446*d*, 448*d*, 450*d*, 452*d*, 454*d*, 456*d* from B-side lower controller 366 to B-side fore-aft EED driver module corresponds to matching B-side verified sequence determinations $426_3$, $426_4$, which also match A-side verified sequence determinations $426_1$, $426_2$.

The timing for sending each of the driver sequence commands 442*a*, 444*a*, 446*a*, 448*a*, 450*a*, 452*a*, 454*a*, 456*a* from A-side upper controller 360 should match the timing for sending driver sequence commands 442*b*, 444*b*, 446*b*, 448*b*, 450*b*, 452*b*, 454*b*, 456*b* from A-side lower controller 362, the timing for sending each of the driver sequence commands 442*c*, 444*c*, 446*c*, 448*c*, 450*c*, 452*c*, 454*c*, 456*c* from B-side upper controller 364, and the timing for sending driver sequence commands 442*d*, 444*d*, 446*d*, 448*d*, 450*d*, 452*d*, 454*d*, 456*d* from B-side lower controller 366 due the two out of three voting scheme producing matching verified sequence determinations $426_1$, $426_2$, $426_3$, and $426_4$.

Determining verified ejection sequences $426_1$, $426_2$, $426_3$, and $426_4$ using the two of three voting scheme, as described above, provides redundancy allowing operation in the presence of a single system failure and increasing the likelihood that sequencer system 122 operates correctly and/or that the timing sequence for outputting driver sequence commands 440a to A-side fore-aft EED driver module 370, the timing sequence for outputting driver sequence commands 440b to A-side fore-aft EED driver module 370, the timing sequence for outputting driver sequence commands 440c to B-side fore-aft EED driver module 372, and the timing sequence for outputting driver sequence commands 440d to B-side fore-aft EED driver module 372 are consistent with one another. In this regard, sequencer system 112 is configured to fire only when desired and to prevent, or reduce a probability of, an unintentional firing.

Figure 5A:
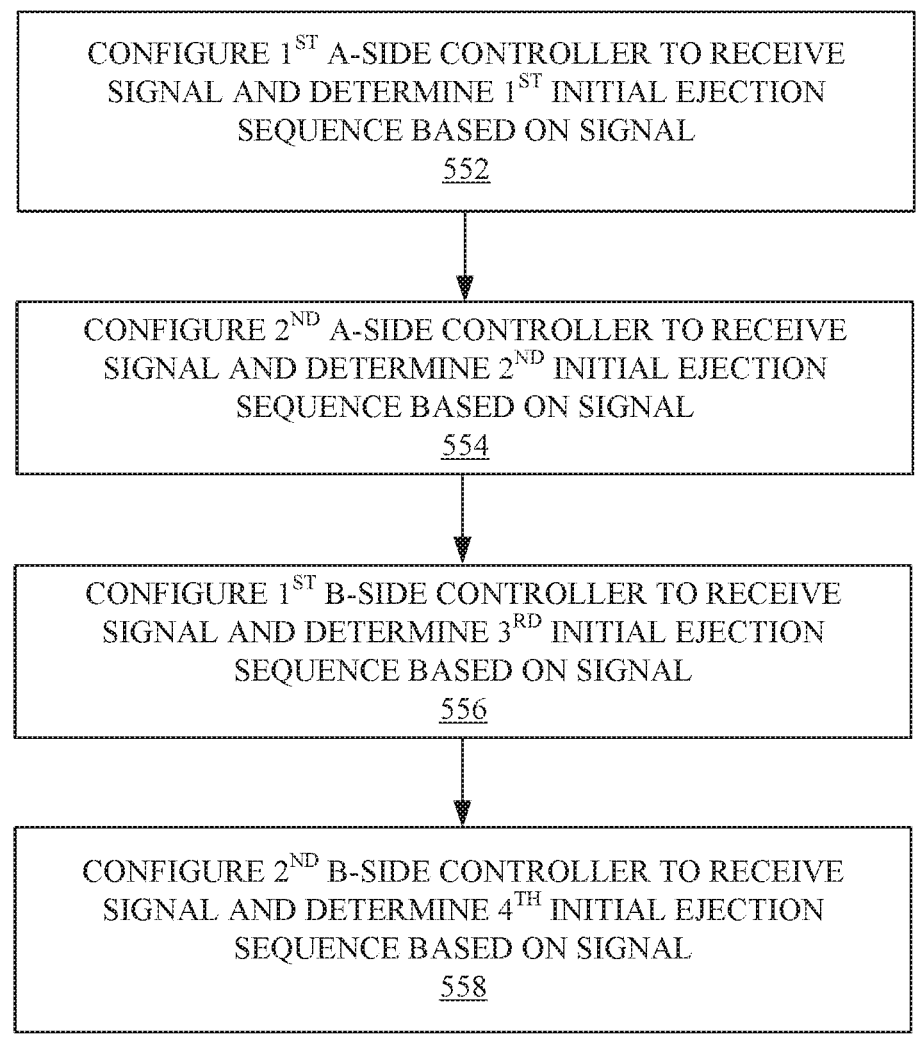
FIGS. 5A, 5B, 5C, and 5D illustrate a method for forming a sequencer system for an ejection assembly, in accordance with various embodiments.

With reference to FIG. 5A, a method 550 of forming a sequencer system for an ejection assembly is illustrated. In accordance with various embodiments, method 550 may comprise configuring a first A-side controller to receive a signal and determine a first initial ejection sequence based on the signal (step 552) and configuring a second A-side controller to receive the signal and determine a second initial ejection sequence based on the signal (step 554). Method 550 may further comprise configuring a first B-side controller to receive the signal and determine a third initial ejection sequence based on the signal (step 556) and configuring a second B-side controller to receive the signal and determine a fourth initial ejection sequence based on the signal (step 558).

With combine reference to FIGS. 3, 4, and 5A, step 552 may include configuring A-side upper controller 160, 360 to determine first initial ejection sequence $222_1$, $422_1$ based on mode select signal 210, sensor signals 408 and/or sequence start signal(s) 411. Step 554 may include configuring A-side lower controller 162, 362 to determine second initial ejection sequence $222_2$, $422_2$ based on mode select signal 210, sensor signals 408 and/or sequence start signal(s) 411. Step 556 may include configuring B-side upper controller 164, 364 to determine third initial ejection sequence $222_3$, $422_3$ based on the mode select signal 210, sensor signals 408 and/or sequence start signal(s) 411. Step 558 may include configuring B-side lower controller 166, 366 to determine fourth initial ejection sequence $222_4$, $422_4$ based on the mode select signal 210, sensor signals 408 and/or sequence start signal(s) 411.

Figure 5B:
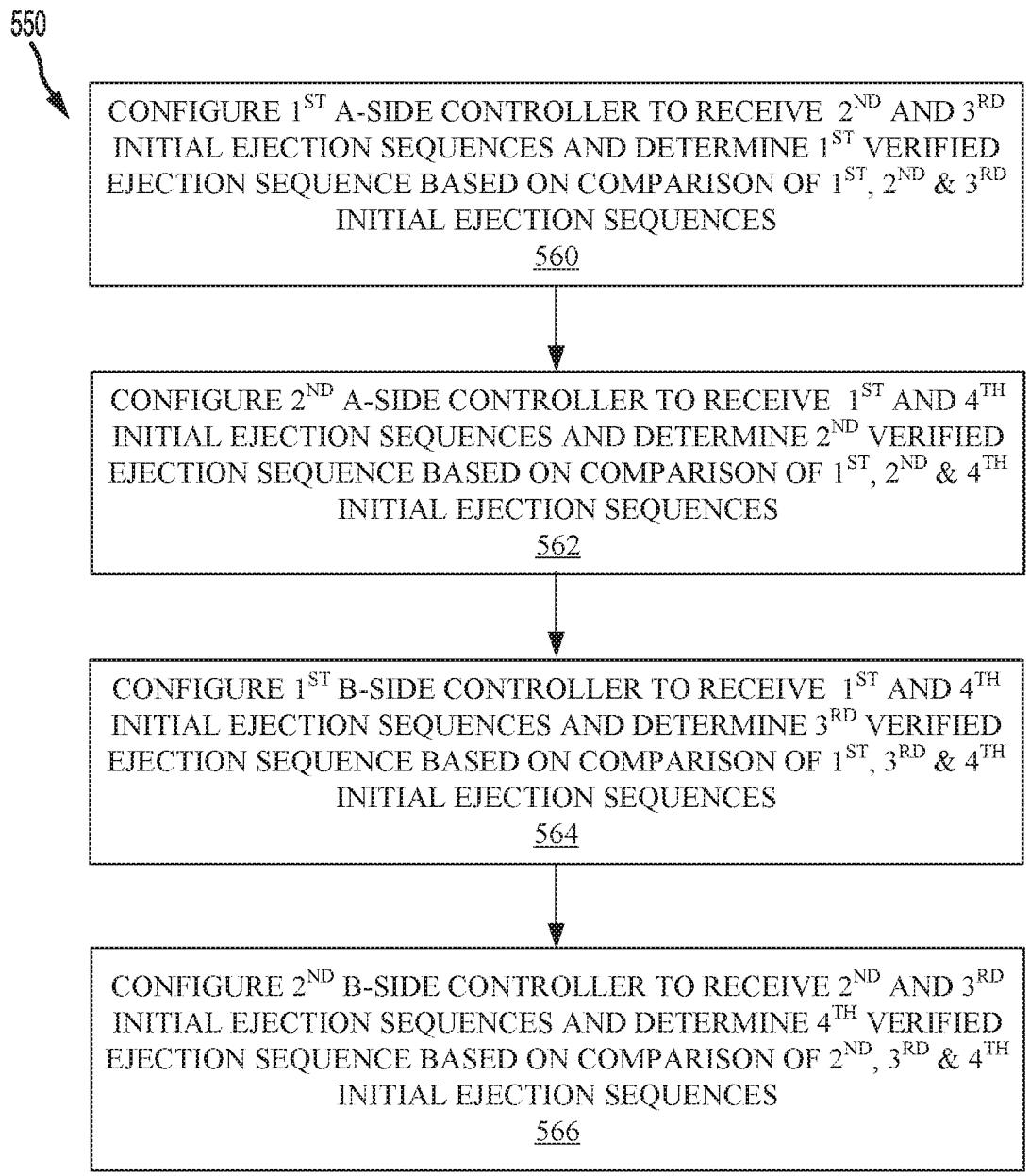

With reference to FIG. 5B, method 550 may further include configuring the first A-side controller to determine a first verified ejection sequence based on a comparison of the first initial ejection sequence to the second initial ejection sequence and the third initial ejection sequence (step 560) and configuring the second A-side controller to determine a second verified ejection sequence based on a comparison of the second initial ejection sequence to the first initial ejection sequence and the fourth initial ejection sequence (Step 562). Method 550 may further comprise configuring the first B-side controller to determine a third verified ejection sequence based on a comparison of the third initial ejection sequence to the first initial ejection sequence and the fourth initial ejection sequence (step 564) and configuring the second B-side controller to determine a fourth verified ejection sequence based on a comparison of the fourth initial ejection sequence to the second initial ejection sequence and the third initial ejection sequence (step 566).

With combine reference to FIGS. 3, 4, and 5B, step 560 may include configuring A-side upper controller 160, 360 to determine first verified ejection sequence $226_1$, $426_1$ based on a comparison of first initial ejection sequence $222_1$, $422_1$ to second initial ejection sequence $222_2$, $422_2$ and third initial ejection sequence $222_3$, $422_3$. Step 562 may include configuring A-side lower controller 162, 362 to determine second verified ejection sequence $226_2$, $426_2$ based on a comparison of the second initial ejection sequence $222_2$, $422_2$ to first initial ejection sequence $222_1$, $422_1$ and fourth initial ejection sequence $222_4$, $422_4$. Step 564 may include configuring B-side upper controller 164, 364 to determine third verified ejection sequence $226_3$, $426_3$ based on a comparison of third initial ejection sequence $222_3$, $422_3$ to first initial ejection sequence $222_1$, $422_1$ and fourth initial ejection sequence $222_4$, $422_4$. Step 566 may include configuring B-side lower controller 166, 366 to determine fourth verified ejection sequence $226_4$, $426_4$ based on a comparison of the fourth initial ejection sequence $222_4$, $422_4$ to second initial ejection sequence $222_2$, $422_2$ and third initial ejection sequence $222_3$, $422_3$.

Figure 5C:
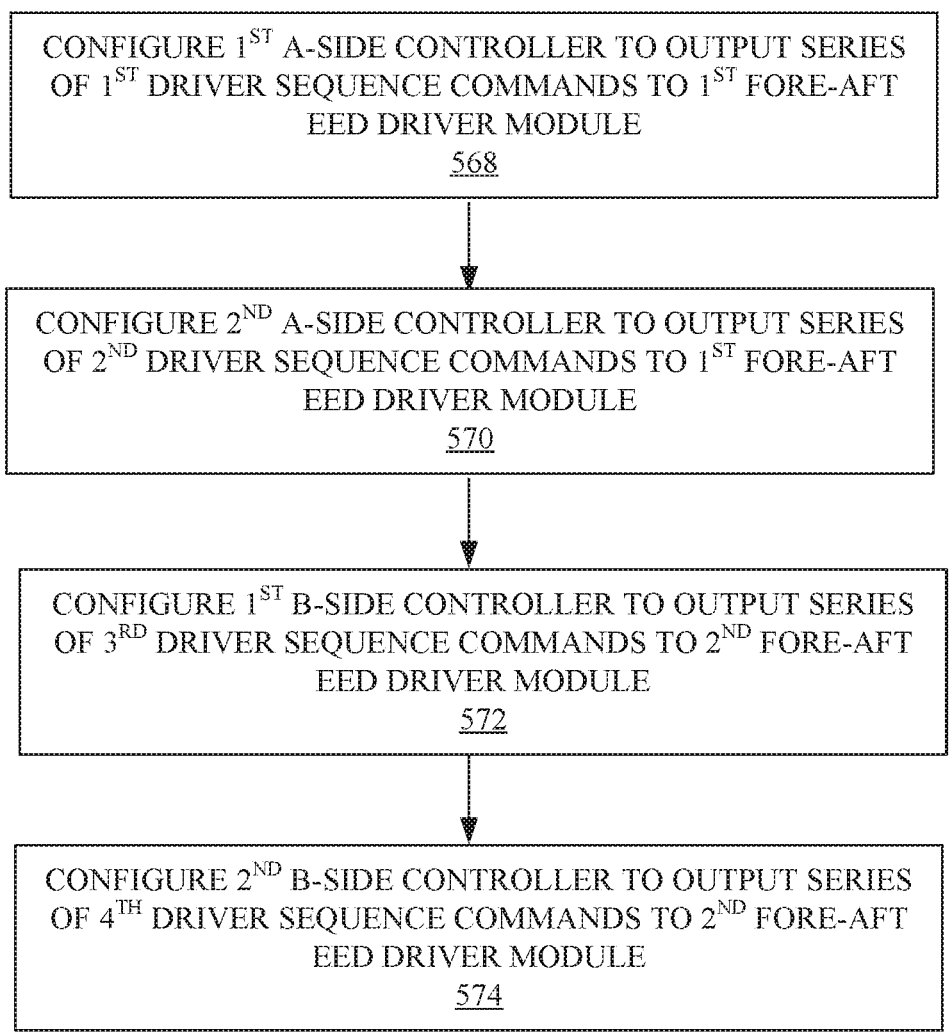

With reference to FIG. 5C, in various embodiments, method 550 may further comprise configuring the first A-side controller to output a series of first driver sequence commands to a first fore-aft EED driver module (step 568) and configuring the second A-side controller to output a series of second driver sequence commands to the first fore-aft EED driver module (step 570). Method 550 may further comprise configuring the first B-side controller to output a series of third driver sequence commands to a second fore-aft EED driver module (step 572) and configuring the second B-side controller to output a series of fourth driver sequence commands to the second fore-aft EED driver module (step 574).

With combine reference to FIGS. 3, 4, and 5C, step 568 may include configuring A-side upper controller 160, 360 to output first driver sequence commands 240a, 440a to A-side fore-aft EED driver module 170. Step 570 may include configuring A-side lower controller 162, 362 to output second driver sequence commands 240b, 440b to A-side fore-aft EED driver module 170. Step 572 include configuring B-side upper controller 164, 364 to output third driver sequence commands 240c, 440c to B-side fore-aft EED driver module 172. Step 574 may include configuring B-side lower controller 166, 366 to output fourth driver sequence commands 240d, 440d to B-side fore-aft EED driver module 172.

Figure 5D:
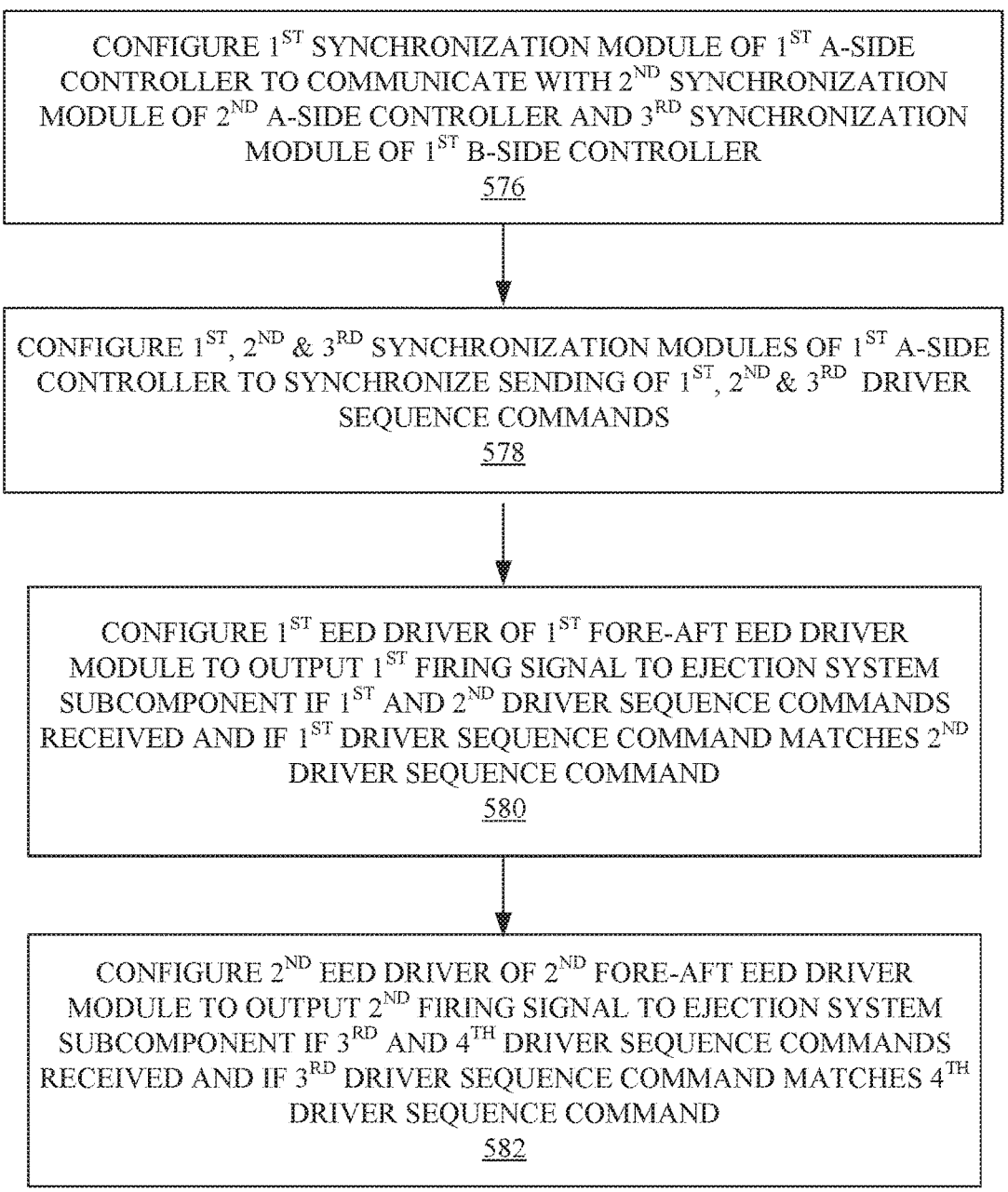

With reference to FIG. 5D, in various embodiments, method 550 may further comprise configuring a first synchronization module of the first A-side controller to communicate with a second synchronization module of the second A-side controller and a third synchronization module of the first B-side controller (step 576) and configuring the first synchronization module, the second synchronization module, and the third synchronization module to synchronize a sending of the series of first driver sequence commands, the series of second driver sequence commands, and the series of third driver sequence commands (step 578).

In various embodiments, method 550 may further comprise configuring a first EED driver of the first fore-aft EED driver module to output a first firing signal to a first ejection system subcomponent if the first EED driver receives a first driver sequence command of the series of first driver sequence commands and a second driver sequence command of the series of the second driver sequence commands and if the first driver sequence command matches the second driver sequence command (step 580). Method 550 may further comprise configuring a second EED driver of the second fore-aft EED driver module to output a second firing signal to the first ejection system subcomponent if the second EED driver receives a third driver sequence command of the series of third driver sequence commands and a fourth driver sequence command of the series of the fourth driver sequence commands and if the third driver sequence command matches the fourth driver sequence command (step 582).

With combine reference to FIGS. 3, 4, and 5D, step 576 may include configuring synchronization module $228_1$, $428_1$ of A-side upper controller 160, 360 to communicate with synchronization module $228_2$, $428_2$ of A-side lower controller 162, 362 and synchronization module $228_3$, $428_3$ of B-side upper controller 164, 364. Step 578 may include configuring synchronization module $228_1$, $428_1$, synchronization module $228_2$, $428_2$, and synchronization module $228_3$, $428_3$ to synchronize a sending of first driver sequence commands 240a 440a, second driver sequence commands 240b. 440b, and third driver sequence commands 240c, 440c.

With combine reference to FIGS. 3 and 5D, in various embodiments, step 580 may include configuring, for example, A-side EED driver 260a, of A-side fore-aft EED driver module 170 to output first firing signal 280a to first ejection system subcomponent 282, if the A-side EED driver 260a receives first driver sequence command 242a and second driver sequence command 242b and if first driver sequence command 242a matches second driver sequence command 242b. Step 582 may include configuring, for example, B-side EED driver 260b of B-side fore-aft EED driver module 172 to output second firing signal 280b to first ejection system subcomponent 282 if B-side EED driver 260b receives third driver sequence command 242c and fourth driver sequence command 242d and if third driver sequence command 242c matches fourth driver sequence command 242d.

Figure 6A:
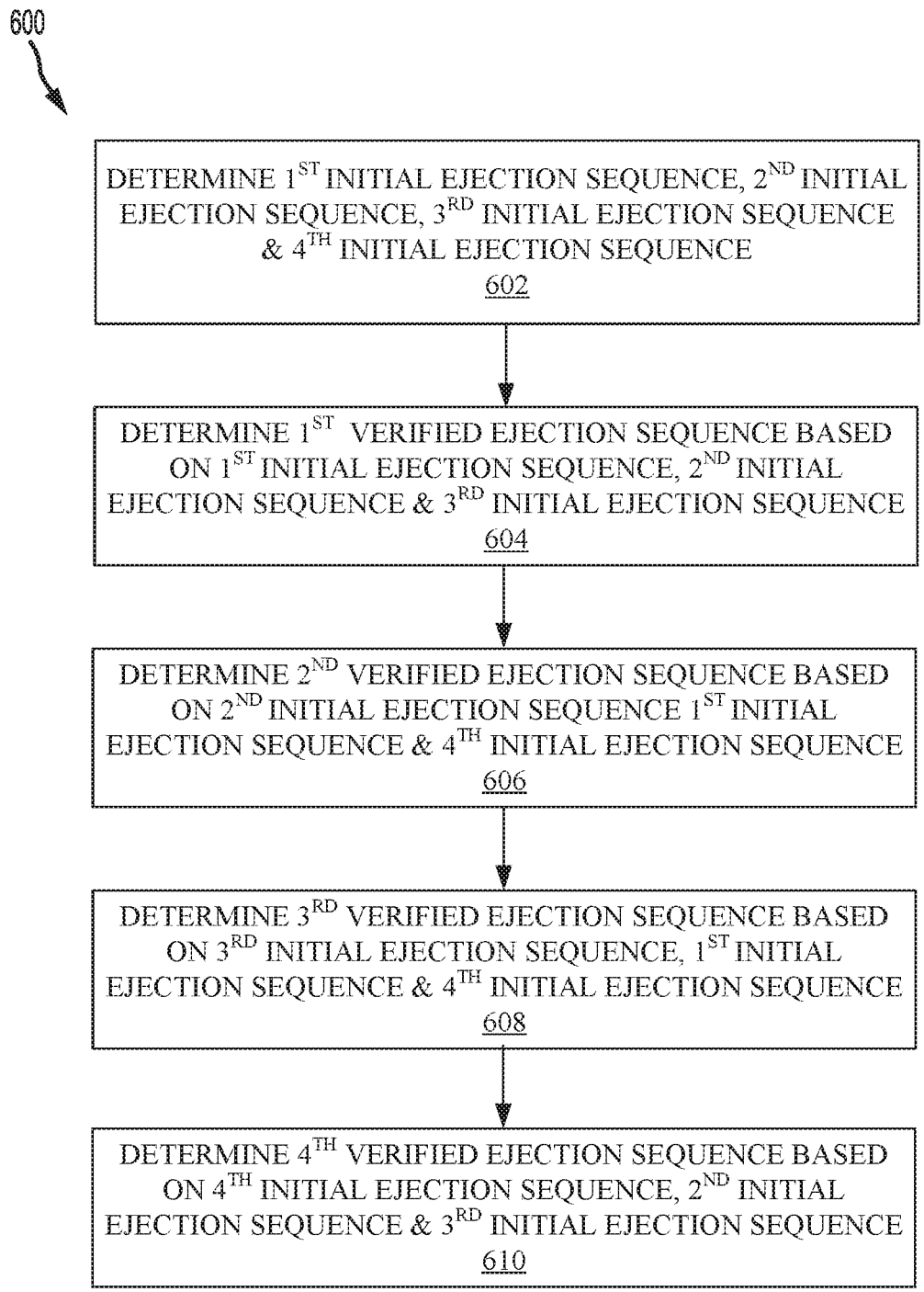
FIGS. 6A, 6B, 6C, 6D, and 6E illustrate a method of determining an ejection sequence, in accordance with various embodiments.

Referring now to FIG. 6A, a method 600 for determining an ejection sequence is also disclosed. In accordance with various embodiments, method 600 may comprise determining, by a first A-side controller, a first initial ejection sequence, determining, by a second A-side controller, a second initial ejection sequence, determining, by a first B-side controller, a third initial ejection sequence, and determining, by a second B-side controller, a fourth initial ejection sequence (step 602).

With combined reference to FIGS. 3, 4, and 6A, step 602 may include determining by A-side upper controllers 160, 360 initial ejection sequence $222_1$, $422_1$. In various embodiments, step 602 may include the first A-side controller (e.g., A-side upper controller 160 or A-side upper controller 360) determining the initial ejection sequence (e.g., initial ejection sequence $222_1$ or initial ejection sequence $422_1$) based on at least one of mode select signals 210, sensor signals 408, and/or sequence start signals 411.

Step 602 may further include determining by A-side lower controllers 162, 362 initial ejection sequence $222_2$, $422_2$. In various embodiments, step 604 may include the second A-side controller (e.g., A-side lower controller 162 or A-side lower controller 362) determining the initial ejection sequence (e.g., initial ejection sequence $222_2$ or initial ejection sequence $422_2$) based on at least one of mode select signals 210, sensor signals 408, and/or sequence start signal 411.

Step 602 may further include determining by B-side upper controllers 164, 364 initial ejection sequence $222_3$, $422_3$. In various embodiments, step 606 may include the first B-side controller (e.g., B-side upper controller 164 or B-side upper controller 364) determining the initial ejection sequence (e.g., initial ejection sequence $222_3$ or initial ejection sequence $422_3$) based on at least one of mode select signals 210, sensor signals 408, and/or sequence start signal 411.

Step 602 may further include determining by B-side lower controllers 166, 366 initial ejection sequence $222_4$, $422_4$. In various embodiments, step 608 may include the second B-side controller (e.g., B-side lower controller 166 or B-side lower controller 366) determining the initial ejection sequence (e.g., initial ejection sequence $222_4$ or initial ejection sequence $422_4$) based on at least one of mode select signals 210, sensor signals 408, and/or sequence start signal 411.

Method 600 may further include determining, by the first A-side controller, a first verified ejection sequence based on a comparison of the first initial ejection sequence, the second initial ejection sequence, and the third initial ejection sequence (step 604). With combined reference to FIGS. 3, 4, and 6A, step 604 may include determining by A-side upper controllers 160, 360 verified ejection sequence $226_1$, $426_1$ based on a comparison of initial ejection sequence $222_1$, $422_1$, initial ejection sequence $222_2$, $422_2$, and initial ejection sequence $222_3$, $422_3$.

Method 600 may further include determining, by the second A-side controller, a second verified ejection sequence based on a comparison of the second initial ejection sequence, the first initial ejection sequence, and the fourth initial ejection sequence (step 606). With combined reference to FIGS. 3, 4, and 6A, step 606 may include determining by A-side lower controllers 162, 362 verified ejection sequence $226_2$, $426_2$ based on a comparison of initial ejection sequence $222_2$, $422_2$, initial ejection sequence $222_1$, $422_1$, and initial ejection sequence $222_4$, $422_4$.

Method 600 may further include determining, by the first A-side controller, a third verified ejection sequence based on a comparison of the third initial ejection sequence, the first initial ejection sequence, and the fourth initial ejection sequence (step 608). With combined reference to FIGS. 3, 4, and 6A, step 608 may include determining by B-side upper controllers 164, 364 verified ejection sequence $226_3$, $426_3$ based on a comparison of initial ejection sequence $222_3$, $422_3$, initial ejection sequence $222_1$, $422_1$, and initial ejection sequence $222_4$, $422_4$.

Method 600 may further include determining, by the second B-side controller, a fourth verified ejection sequence based on a comparison of the second initial ejection sequence, the third initial ejection sequence, and the fourth initial ejection sequence (step 610). With combined reference to FIGS. 3, 4, and 6A, step 610 may include determining by B-side lower controllers 166, 366 verified ejection sequences $226_4$, $426_4$ based on a comparison of initial ejection sequence $222_4$, $422_4$, initial ejection sequence $222_2$, $422_2$, and initial ejection sequence $222_3$, $422_3$.

Figure 6B:
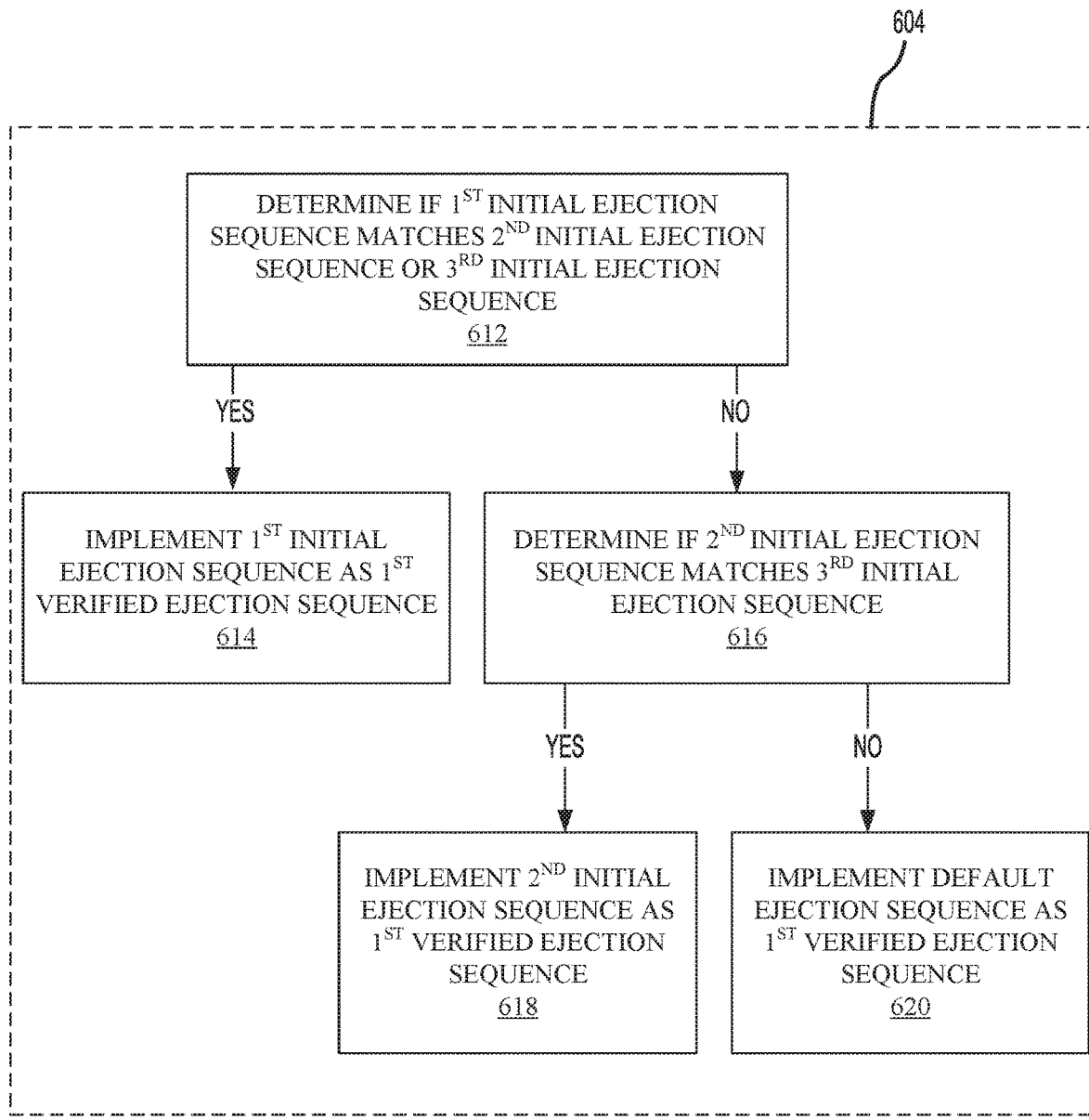

With reference to FIG. 6B, in various embodiments, step 604 may include determining, by the first A-side controller, if the first initial ejection sequence matches the second initial ejection sequence or the third initial ejection sequence (step 612) and implementing, by the first A-side controller, the first initial ejection sequence as the first verified ejection sequence if the first initial ejection sequence matches the second initial ejection sequence or the third initial ejection sequence (step 614).

In various embodiments, step 604 may further comprise of determining, by the first A-side controller, if the second initial ejection sequence matches the third initial ejection sequence (step 616) and implementing, by the first A-side controller, the second initial ejection sequence as the first verified ejection sequence if the first initial ejection sequence does not match the second initial ejection sequence or the third initial ejection sequence and if the second initial ejection sequence matches the third initial ejection sequence (step 618).

In various embodiments, the step 604 may further comprise implementing, by the first A-side controller, a default ejection sequence as the first verified ejection sequence if the first initial ejection sequence does not match the second initial ejection sequence or the third initial ejection sequence and if the second initial ejection sequence does not match the third initial ejection sequence (step 620).

Figure 6C:
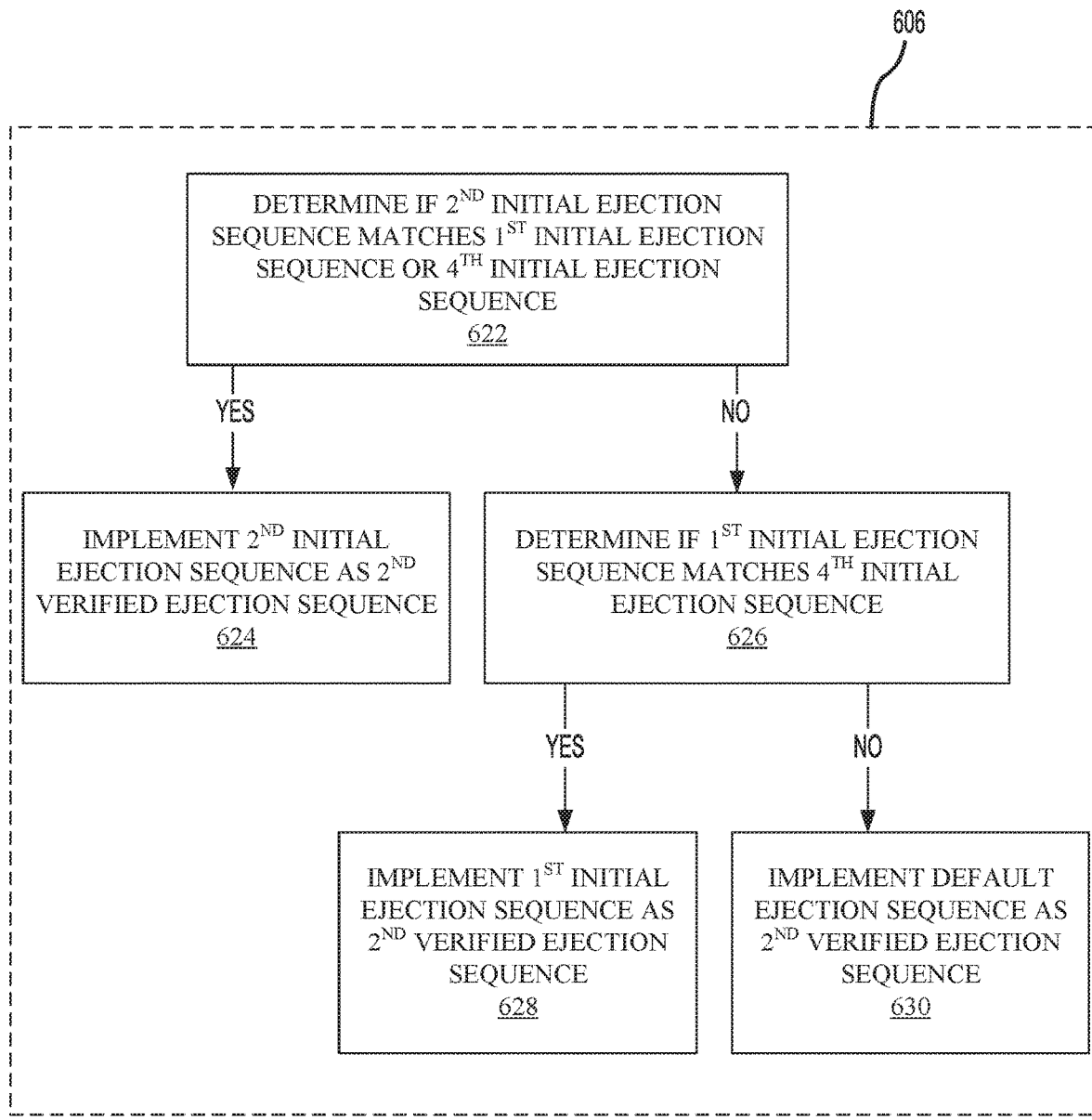

With reference to FIG. 6C, in various embodiments, step 606 may comprise determining, by the second A-side controller, if the second initial ejection sequence matches the first initial ejection sequence or the fourth initial ejection sequence (step 622), and implementing, by the second A-side controller, the second initial ejection sequence as the second verified ejection sequence if the second initial ejection sequence matches the first initial ejection sequence or the fourth initial ejection sequence (step 624). Step 606 may further comprise determining, by the second A-side controller, if the first initial ejection sequence matches the fourth initial ejection sequence (step 626), implementing, by the second A-side controller, the first initial ejection sequence as the second verified ejection sequence if the second initial ejection sequence does not match the first initial ejection sequence or the fourth initial ejection sequence and if the first initial ejection sequence matches the fourth initial ejection sequence (step 628), and implementing, by the second A-side controller, a default ejection sequence as the second verified ejection sequence if the second initial ejection sequence does not match the first initial ejection sequence or the fourth initial ejection sequence and if the first initial ejection sequence does not match the fourth initial ejection sequence (step 630).

Figure 6D:
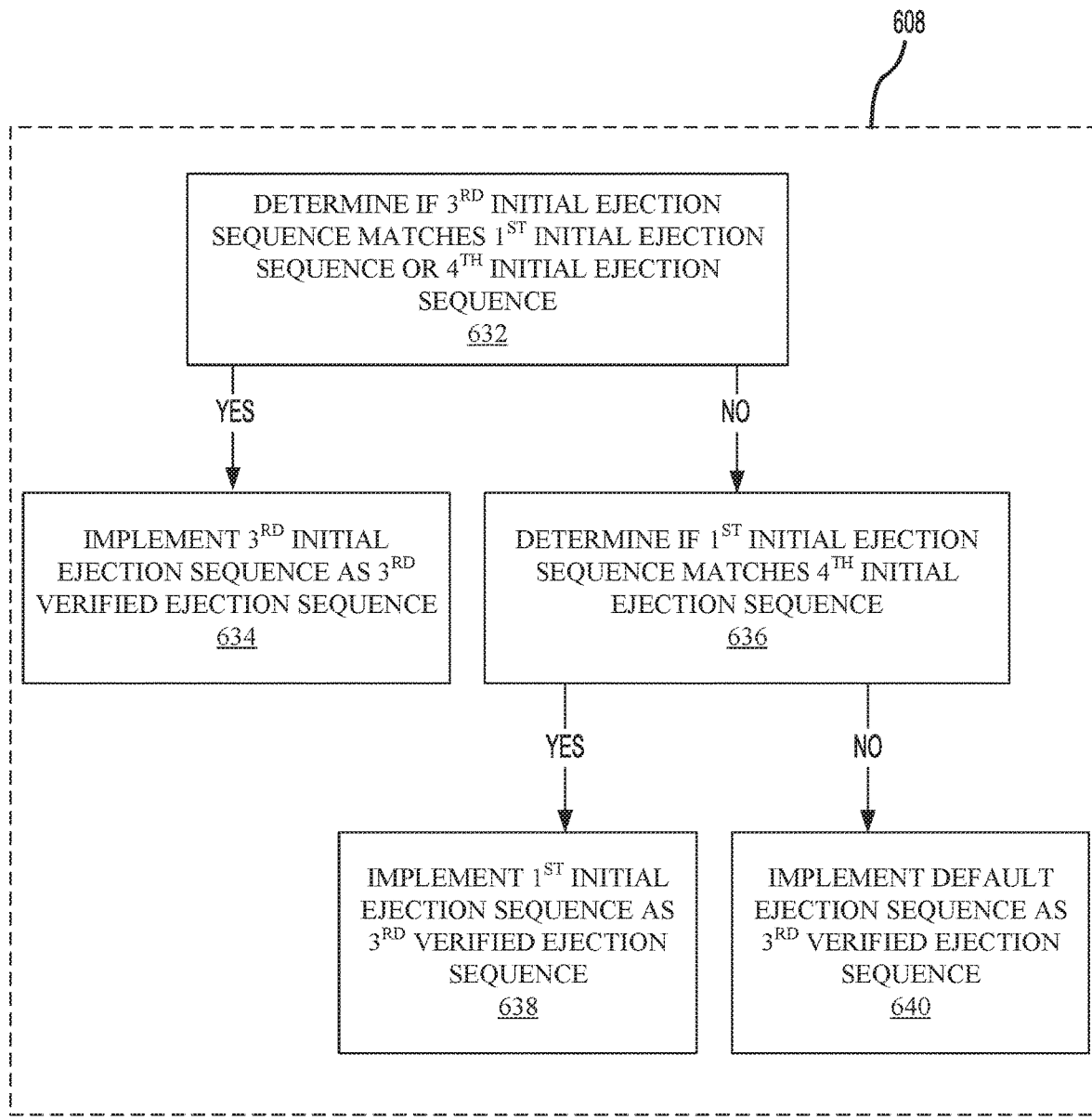

With reference to FIG. 6D, in various embodiments, step 608 may comprise determining, by the first B-side controller, if the third initial ejection sequence matches the first initial ejection sequence or the fourth initial ejection sequence (step 632), and implementing, by the first B-side controller, the third initial ejection sequence as the third verified ejection sequence if the third initial ejection sequence matches the first initial ejection sequence or the fourth initial ejection sequence (step 634). Step 608 may further comprise determining, by the first B-side controller, if the first initial ejection sequence matches the fourth initial ejection sequence (step 636), implementing, by the first B-side controller, the first initial ejection sequence as the third verified ejection sequence if the third initial ejection sequence does not match the first initial ejection sequence or the fourth initial ejection sequence and if the first initial ejection sequence matches the fourth initial ejection sequence (step 638), and implementing, by the first B-side controller, the default ejection sequence as the third verified ejection sequence if the third initial ejection sequence does not match the first initial ejection sequence or the fourth initial ejection sequence and if the first initial ejection sequence does not match the fourth initial ejection sequence (step 640).

Figure 6E:
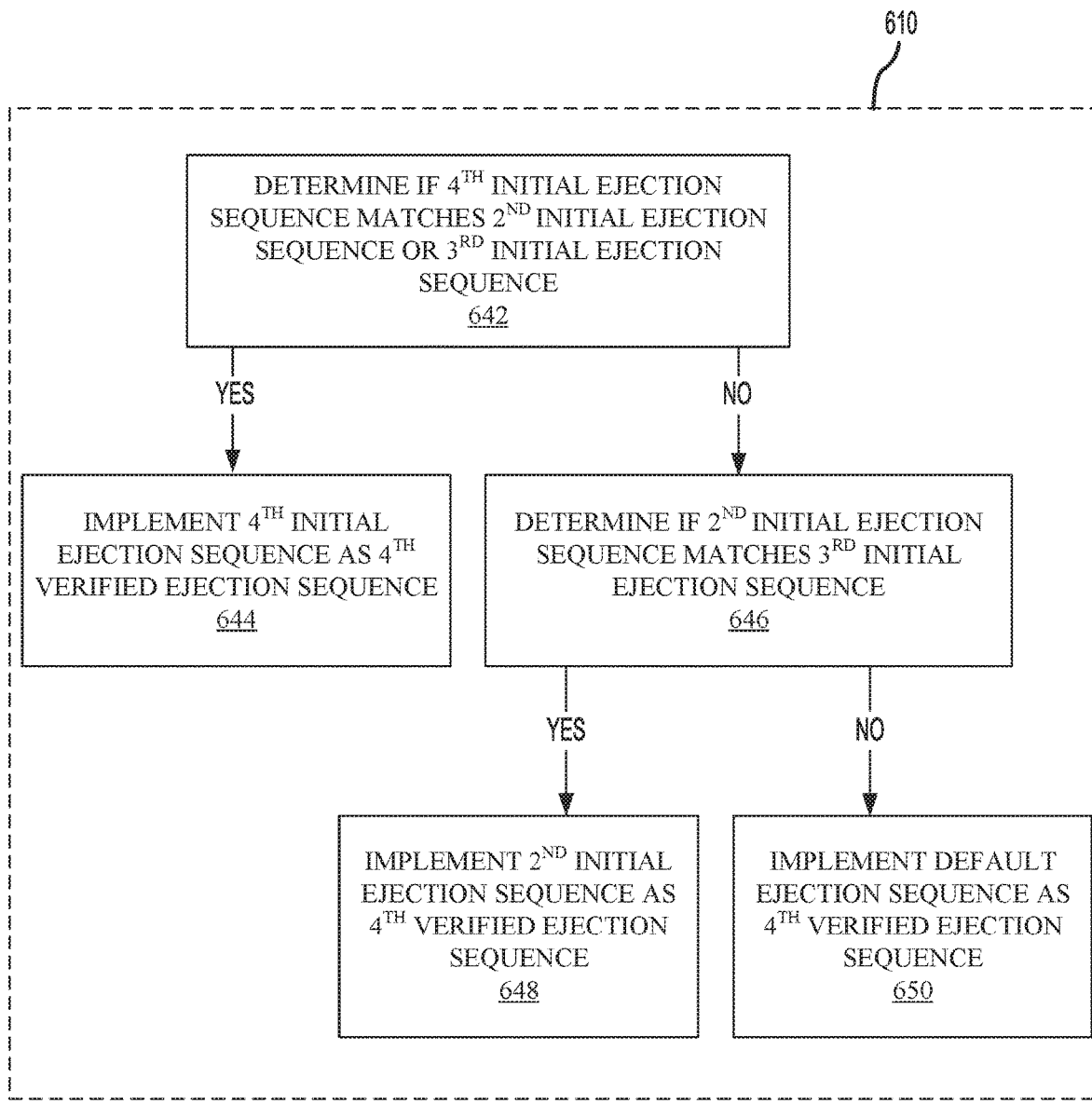

With reference to FIG. 6E, in various embodiments, step 610 may include determining, by the second B-side controller, if the fourth initial ejection sequence matches of the second initial ejection sequence or the third initial ejection sequence (step 642) and implementing, by the second B-side controller, the fourth initial ejection sequence as the fourth verified ejection sequence if the fourth initial ejection sequence matches the second initial ejection sequence or the third initial ejection sequence (step 644). Step 604 may further comprise determining, by the second B-side controller, if the second initial ejection sequence matches the third initial ejection sequence (step 646), implementing, by the second B-side controller, the second initial ejection sequence as the fourth verified ejection sequence if the fourth initial ejection sequence does not match the second initial ejection sequence or the third initial ejection sequence and if the second initial ejection sequence matches the third initial ejection sequence (step 648), and implementing, by the second B-side controller, the default ejection sequence as the fourth verified ejection sequence if the fourth initial ejection sequence does not match the second initial ejection sequence or the third initial ejection sequence and if the second initial ejection sequence does not match the third initial ejection sequence (step 650).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not

What is claimed is:

1. A sequencer system for an ejection assembly, the sequencer system comprising:
   a first A-side controller configured to determine a first initial ejection sequence and a first verified ejection sequence and to output a series of first driver sequence commands, wherein a timing of when each of the first driver sequence commands is output is based on the first verified ejection sequence;
   a second A-side controller configured to determine a second initial ejection sequence and a second verified ejection sequence and to output a series of second driver sequence commands, wherein a timing of when each of the second driver sequence commands is output is based on the second verified ejection sequence;
   a first B-side controller configured to determine a third initial ejection sequence and a third verified ejection sequence and to output a series of third driver sequence commands, wherein a timing of when each of the third driver sequence command is output is based on the third verified ejection sequence;
   a second B-side controller configured to determine a fourth initial ejection sequence and a fourth verified ejection sequence and to output a series of fourth driver sequence commands, wherein a timing of when each of the fourth driver sequence command is output is based on the fourth verified ejection sequence;
   an A-side electronic explosive device driver module configured to receive the series of first driver sequence commands from the first A-side controller and the series of second driver sequence commands from the second A-side controller; and
   a B-side electronic explosive device driver module configured to receive the series of third driver sequence commands from the first B-side controller and the series of fourth driver sequence commands from the second B-side controller, wherein:
   the first A-side controller is configured to determine the first verified ejection sequence based on a comparison of the first initial ejection sequence to the second initial ejection sequence and the third initial ejection sequence,
   the second A-side controller is configured to determine the second verified ejection sequence based on a comparison of the second initial ejection sequence to the first initial ejection sequence and the fourth initial ejection sequence,
   the first B-side controller is configured to determine the third verified ejection sequence based on a comparison of the third initial ejection sequence to the first initial ejection sequence and the fourth initial ejection sequence, and
   the second B-side controller is configured to determine the fourth verified ejection sequence based on a comparison of the fourth initial ejection sequence to the third initial ejection sequence and the second initial ejection sequence.

2. The sequencer system of claim 1, wherein the first A-side controller is configured to implement the first initial ejection sequence as the first verified ejection sequence in response to the first A-side controller determining that the first initial ejection sequence matches at least one of the second initial ejection sequence or the third initial ejection sequence, and wherein the first A-side controller is configured to implement at least one of the second initial ejection sequence or the third initial ejection sequence as the first verified ejection sequence in response to the first A-side controller determining that the second initial ejection sequence matches the third initial ejection sequence and that the first initial ejection sequence does not match the second initial ejection sequence.

3. The sequencer system of claim 2, wherein the A-side electronic explosive device driver module includes a first A-side electronic explosive device driver configured to receive a first driver sequence command of the series of first driver sequence commands from the first A-side controller and a second driver sequence command of the series of second driver sequence commands from the second A-side controller; and
   wherein the B-side electronic explosive device driver module includes a second electronic explosive device driver configured to receive a third driver sequence command of the series of third driver sequence commands from the first B-side controller and a fourth driver sequence command of the series of fourth driver sequence commands from the second B-side controller.

4. The sequencer system of claim 3, wherein the A-side electronic explosive device driver is configured to output a first firing signal in response to determining that the first driver sequence command matches the second driver sequence command.

5. The sequencer system of claim 4, wherein the B-side electronic explosive device driver is configured to output a second firing signal in response to determining that the third driver sequence command matches the fourth driver sequence command.

6. The sequencer system of claim 5, wherein the first firing signal and the second firing signal are output to an ejection system subcomponent.

7. The sequencer system of claim 6, wherein the ejection system subcomponent is at least one of a canopy driver or a catapult driver.

8. The sequencer system of claim 5, wherein the first firing signal and the second firing signal are output to an ejection seat subcomponent, and wherein the ejection seat subcomponent is at least one of a parachute mortar or a harness release thruster.

9. An ejection seat, comprising:
   a parachute mortar;
   a harness release thruster; and
   an ejection seat sequencer system located on the ejection seat and configured to control a timing for firing the parachute mortar and the harness release thruster, the ejection seat sequencer system comprising:
   a first A-side controller configured to determine a first initial ejection sequence and a first verified ejection sequence and to output a series of first driver sequence commands, wherein a timing of when each of the first driver sequence command is output is based on the first verified ejection sequence;
   a second A-side controller configured to determine a second initial ejection sequence and a second verified ejection sequence and to output a series of second driver sequence commands, wherein a timing of when each of the second driver sequence commands is output is based on the second verified ejection sequence;
   a first B-side controller configured to determine a third initial ejection sequence and a third verified ejection sequence and to output a series of third driver sequence commands, wherein a timing of when each of the third driver sequence command is output is based on the third verified ejection sequence;
a second B-side controller configured to determine a fourth initial ejection sequence and a fourth verified ejection sequence and to output a series of fourth driver sequence commands, wherein a timing of when each of the fourth driver sequence command is output is based on the fourth verified ejection sequence;
a first electronic explosive device driver module configured to receive the series of first driver sequence commands from the first A-side controller and the series of second driver sequence commands from the second A-side controller; and
a second electronic explosive device driver module configured to receive the series of third driver sequence commands from the first B-side controller and the series of fourth driver sequence commands from the second B-side controller, wherein:
the first A-side controller is configured to determine the first verified ejection sequence based on a comparison of the first initial ejection sequence to the second initial ejection sequence and the third initial ejection sequence,
the second A-side controller is configured to determine the second verified ejection sequence based on a comparison of the second initial ejection sequence to the first initial ejection sequence and the fourth initial ejection sequence,
the first B-side controller is configured to determine the third verified ejection sequence based on a comparison of the third initial ejection sequence to the first initial ejection sequence and the fourth initial ejection sequence, and
the second B-side controller is configured to determine the fourth verified ejection sequence based on a comparison of the fourth initial ejection sequence to the third initial ejection sequence and the second initial ejection sequence.

10. The ejection seat of claim 9, wherein:
the first A-side controller is configured to implement the first initial ejection sequence as the first verified ejection sequence in response to the first A-side controller determining that the first initial ejection sequence matches at least one of the second initial ejection sequence or the third initial ejection sequence;
the second A-side controller is configured to implement the second initial ejection sequence as the second verified ejection sequence in response to the second A-side controller determining that the second initial ejection sequence matches at least one of the first initial ejection sequence or the fourth initial ejection sequence;
the first B-side controller is configured to implement the third initial ejection sequence as the third verified ejection sequence in response to the first B-side controller determining that the third initial ejection sequence matches at least one of the first initial ejection sequence or the fourth initial ejection sequence; and
the second B-side controller is configured to implement the fourth initial ejection sequence as the fourth verified ejection sequence in response to the second B-side controller determining that the fourth initial ejection sequence matches at least one of the third initial ejection sequence or the second initial ejection sequence.

11. The ejection seat of claim 10, wherein:
the first A-side controller is configured to implement at least one of the second initial ejection sequence or the third initial ejection sequence as the first verified ejection sequence in response to the first A-side controller determining that the second initial ejection sequence matches the third initial ejection sequence and that the first initial ejection sequence does not match the second initial ejection sequence;
the second A-side controller is configured to implement at least one of the first initial ejection sequence or the fourth initial ejection sequence as the second verified ejection sequence in response to the second A-side controller determining that the first initial ejection sequence matches the fourth initial ejection sequence and that the second initial ejection sequence does not match the first initial ejection sequence;
the first B-side controller is configured to implement at least one of the first initial ejection sequence or the fourth initial ejection sequence as the third verified ejection sequence in response to the first B-side controller determining that the first initial ejection sequence matches the fourth initial ejection sequence and that the third initial ejection sequence does not match the first initial ejection sequence; and
the second B-side controller is configured to implement at least one of the second initial ejection sequence or the third initial ejection sequence as the fourth verified ejection sequence in response to the second B-side controller determining that the second initial ejection sequence matches the third initial ejection sequence and that the fourth initial ejection sequence does not match the third initial ejection sequence.

12. The ejection seat of claim 9, wherein the first electronic explosive device driver module includes a first electronic explosive device driver configured to output a first firing signal to the parachute mortar in response to determining that a first driver sequence command of the series of first driver sequence commands matches a second driver sequence command of the series of first driver sequence commands, and wherein the second electronic explosive device driver module includes a second electronic explosive device driver configured to output a second firing signal to the parachute mortar in response to determining that a third driver sequence command of the series of third driver sequence commands matches a fourth driver sequence command of the series of fourth driver sequence commands.

13. A method of determining an ejection sequence, comprising:
determining, by a first A-side controller, a first initial ejection sequence;
determining by, a second A-side controller, a second initial ejection sequence;
determining by, a first B-side controller, a third initial ejection sequence;
determining by, a second B-side controller, a fourth initial ejection sequence;
determining, by the first A-side controller, a first verified ejection sequence based on a comparison of the first initial ejection sequence, the second initial ejection sequence, and the third initial ejection sequence;
determining, by the first A-side controller, a timing sequence for a series of first driver sequence commands based on the first verified ejection sequence; and
outputting, by the first A-side controller, the series of first driver sequence commands to an electronic explosive device driver module.

14. The method claim 13, wherein the determining, by the first A-side controller, the first verified ejection sequence comprises:
   determining, by the first A-side controller, whether the first initial ejection sequence matches at least one of the second initial ejection sequence or the third initial ejection sequence; and
   implementing, by the first A-side controller, the first initial ejection sequence as the first verified ejection sequence in response to determining that the first initial ejection sequence matches the at least one of the second initial ejection sequence or the third initial ejection sequence.

15. The method of claim 14, wherein the determining, by the first A-side controller, the first verified ejection sequence further comprises:
   implementing, by the first A-side controller, a default ejection sequence as the first verified ejection sequence in response to determining that the first initial ejection sequence does not match the at least one of the second initial ejection sequence or the third initial ejection sequence and that the second initial ejection sequence does not match the third initial ejection sequence.

16. The method of claim 14, further comprising:
   determining, by the second A-side controller, a second verified ejection sequence based on a comparison of the second initial ejection sequence, the first initial ejection sequence, and the fourth initial ejection sequence;
   determining, by the first B-side controller, a third verified ejection sequence based on a comparison of the third initial ejection sequence, the first initial ejection sequence, and the fourth initial ejection sequence; and
   determining, by the second B-side controller, a fourth verified ejection sequence based on a comparison of the fourth initial ejection sequence, the second initial ejection sequence, and the third initial ejection sequence.

17. The method of claim 16, wherein the determining, by the second A-side controller, the second verified ejection sequence comprises:
   determining, by the second A-side controller, whether the second initial ejection sequence matches at least one of the first initial ejection sequence or the fourth initial ejection sequence;
   determining, by the second A-side controller, whether the first initial ejection sequence matches the fourth initial ejection sequence; and
   at least one of:
      implementing, by the second A-side controller, the second initial ejection sequence as the second verified ejection sequence in response to determining that the second initial ejection sequence matches the at least one of the first initial ejection sequence or the fourth initial ejection sequence;
      implementing, by the second A-side controller, the first initial ejection sequence as the second verified ejection sequence in response to determining that the second initial ejection sequence does not match the at least one of the first initial ejection sequence or the fourth initial ejection sequence and that the first initial ejection sequence matches the fourth initial ejection sequence; or
      implementing, by the second A-side controller, a default ejection sequence as the second verified ejection sequence in response to determining that the second initial ejection sequence does not match the at least one of the first initial ejection sequence or the fourth initial ejection sequence and that the first initial ejection sequence does not match the fourth initial ejection sequence.

18. The method of claim 17, wherein the determining, by the first B-side controller, the third verified ejection sequence comprises:
   determining, by the first B-side controller, whether the third initial ejection sequence matches at least one of the first initial ejection sequence or the fourth initial ejection sequence;
   determining, by the first B-side controller, whether the first initial ejection sequence matches the fourth initial ejection sequence; and
   at least one of:
      implementing, by the first B-side controller, the third initial ejection sequence as the third verified ejection sequence in response to determining that the third initial ejection sequence matches the at least one of the first initial ejection sequence or the fourth initial ejection sequence;
      implementing, by the first B-side controller, the first initial ejection sequence as the third verified ejection sequence in response to determining that the third initial ejection sequence does not match the at least one of the first initial ejection sequence or the fourth initial ejection sequence and that the first initial ejection sequence matches the fourth initial ejection sequence; or
      implementing, by the first B-side controller, the default ejection sequence as the third verified ejection sequence in response to determining that the third initial ejection sequence does not match the at least one of the first initial ejection sequence or the fourth initial ejection sequence and that the first initial ejection sequence does not match the fourth initial ejection sequence.

19. The method of claim 13, wherein the determining, by the first A-side controller, the first verified ejection sequence further comprises:
   determining, by the first A-side controller, whether the first initial ejection sequence matches at least one of the second initial ejection sequence or the third initial ejection sequence;
   determining, by the first A-side controller, whether the second initial ejection sequence matches the third initial ejection sequence; and
   implementing, by the first A-side controller, the second initial ejection sequence as the first verified ejection sequence in response to determining that the first initial ejection sequence does not match the at least one of the second initial ejection sequence or the third initial ejection sequence and that the second initial ejection sequence matches the third initial ejection sequence.

* * * * *